US012699053B2

(12) United States Patent
Doherty et al.

(10) Patent No.: US 12,699,053 B2
(45) Date of Patent: Aug. 4, 2026

(54) MODULAR ACCESSORY FOR A RAMAN SPECTROMETER

(71) Applicants: THERMO SCIENTIFIC PORTABLE ANALYTICAL INSTRUMENTS INC., Tewksbury, MA (US); LIFE TECHNOLOGIES CORPORATION, Carlsbad, CA (US)

(72) Inventors: Walter Doherty, Sharon, MA (US); Lisa Lee, Boston, MA (US); Brandon Fisher, Boston, MA (US); Katelyn Benson, Tewksbury, MA (US)

(73) Assignees: Thermo Scientific Portable Analytical Instruments Inc., Tewksbury, MA (US); Life Technologies Corporation, Carlsbad, CA (US)

( * ) Notice: Subject to any disclaimer, the term of this patent is extended or adjusted under 35 U.S.C. 154(b) by 174 days.

(21) Appl. No.: 18/836,454

(22) PCT Filed: Jan. 26, 2023

(86) PCT No.: PCT/US2023/061324
§ 371 (c)(1),
(2) Date: Aug. 7, 2024

(87) PCT Pub. No.: WO2023/154625
PCT Pub. Date: Aug. 17, 2023

(65) Prior Publication Data
US 2025/0146942 A1       May 8, 2025

Related U.S. Application Data

(60) Provisional application No. 63/267,873, filed on Feb. 11, 2022.

(51) Int. Cl.
*G01N 21/65* (2006.01)

(52) U.S. Cl.
CPC .................................... *G01N 21/65* (2013.01)

(58) Field of Classification Search
CPC ...... G01J 3/0208; G01J 3/0248; G01J 3/0264; G01J 3/0272; G01J 3/0291; G01J 3/44; G01N 21/65; G01N 2201/0221
See application file for complete search history.

(56) References Cited

U.S. PATENT DOCUMENTS

| | | | |
|---|---|---|---|
| 2013/0271760 A1* | 10/2013 | Froigneux | G01N 21/65 356/301 |
| 2016/0334277 A1* | 11/2016 | Lam | G01J 3/0291 |
| 2018/0136042 A1* | 5/2018 | Goldring | G01J 3/10 |

* cited by examiner

*Primary Examiner* — Hina F Ayub

(57) ABSTRACT

A modular accessory for orienting a light path at different angles to an optical axis of a spectrometer is described. The modular accessory includes an attachment module configured to couple to a Raman spectrometer. The attachment module attaches to a base module which includes a visible light imager. An objective module couples to the base module and includes an objective configured to provide an optical path for the sample light beam travelling from a sample along a light path to an objective lens of the objective, through the objective, and to the input for the sample light beam of the base module. The modules can provide tilt and swivel angles to orient the light path at different angles. Portable Raman systems including the modular accessory and a Raman spectrometer are also described as well as methods for using the systems.

18 Claims, 28 Drawing Sheets

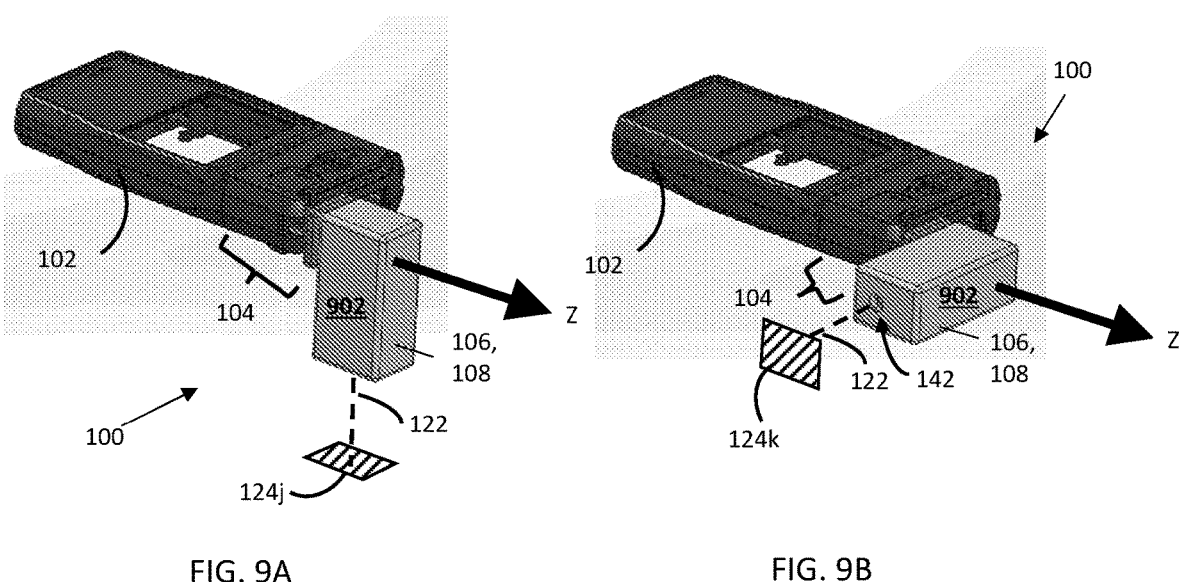
FIG. 9A                  FIG. 9B
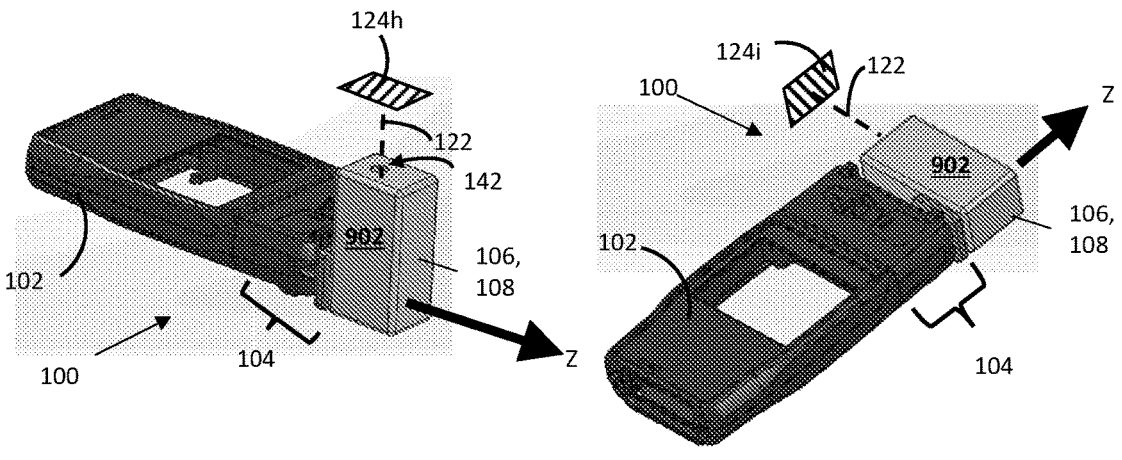
FIG. 9C                  FIG. 9D

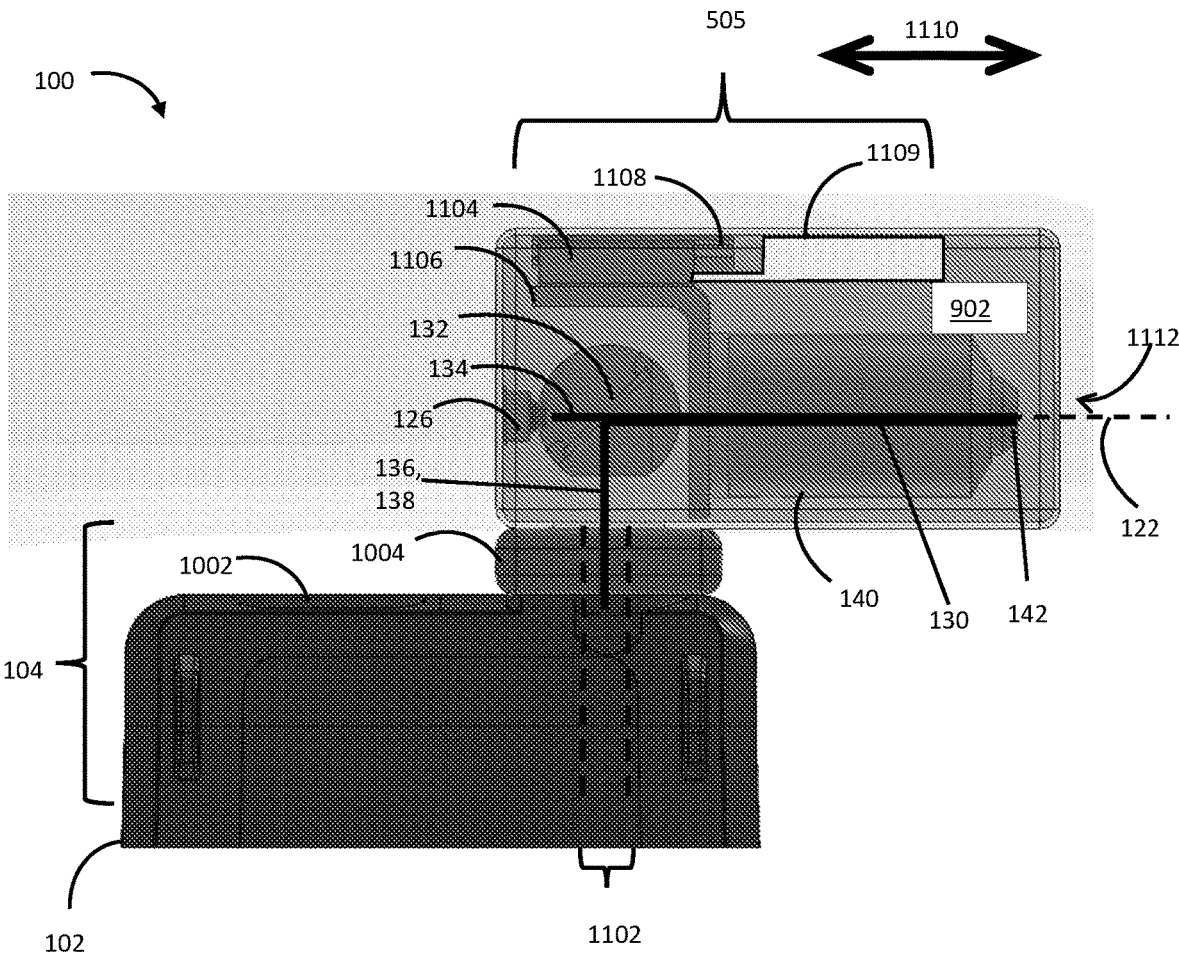
FIG. 11

FIG. 15A
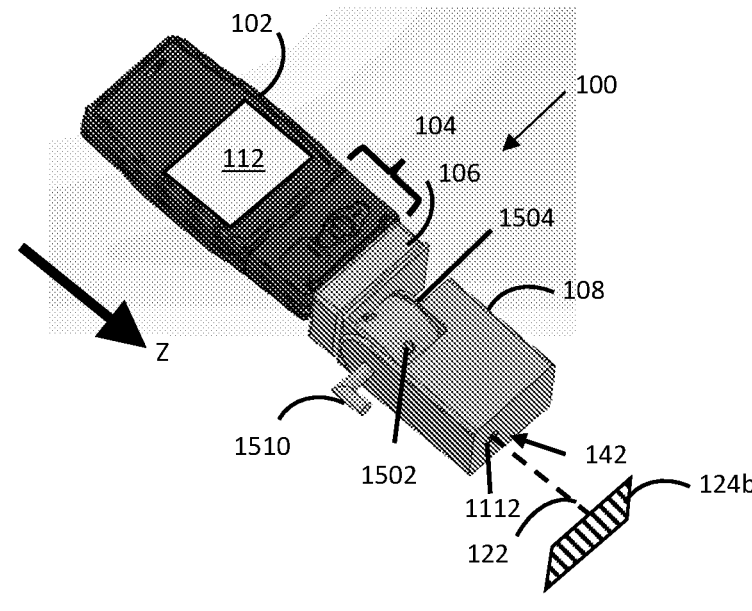
FIG. 15B
FIG. 15C
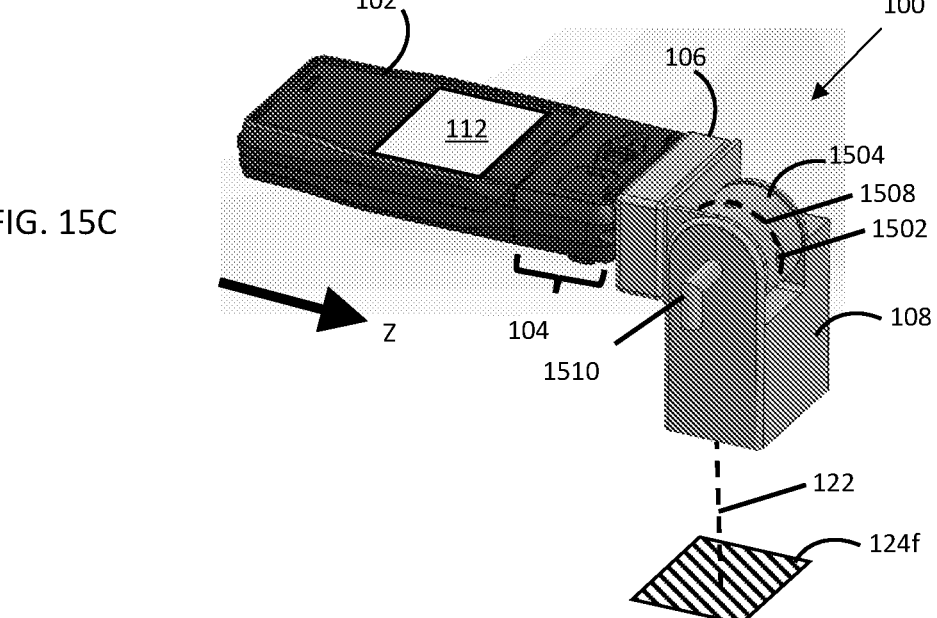

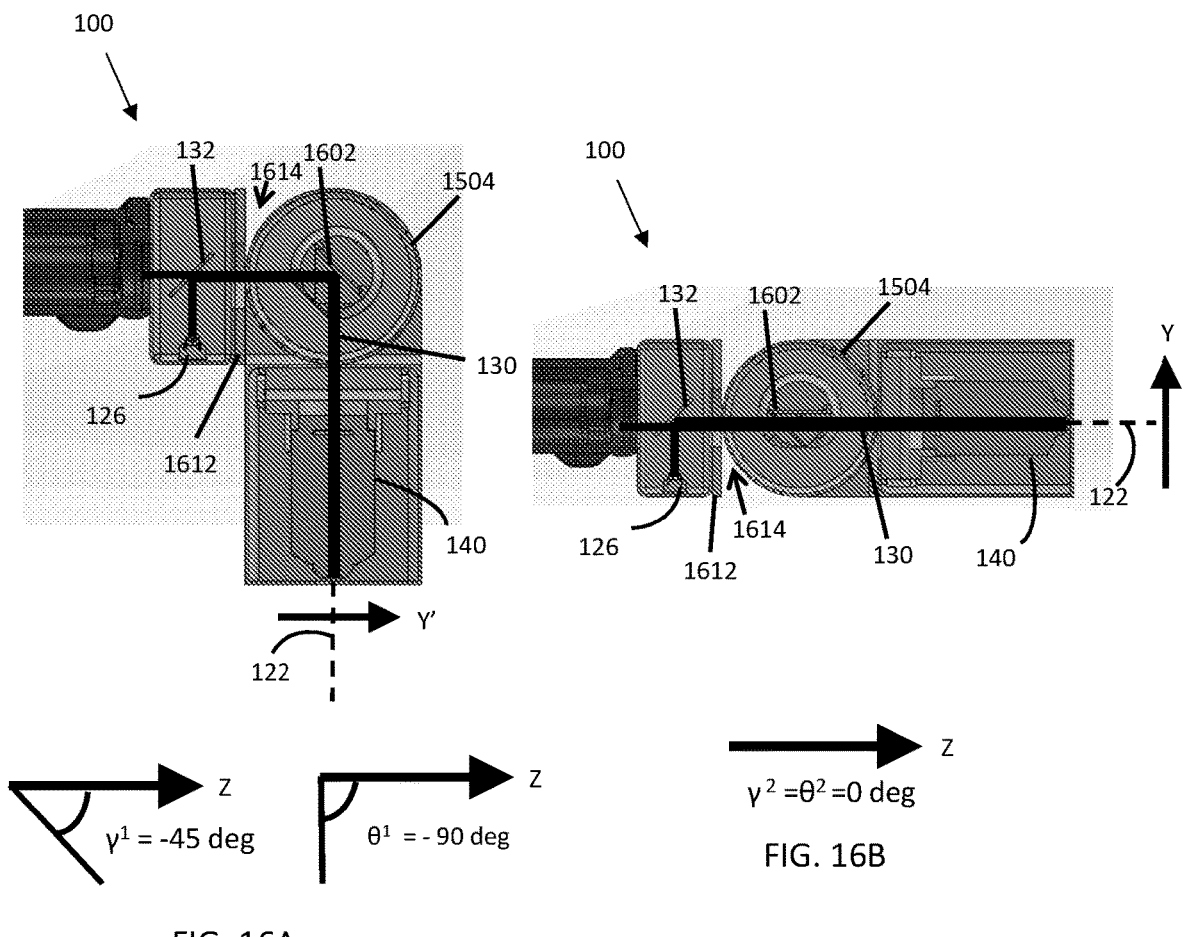
FIG. 16A
FIG. 16B
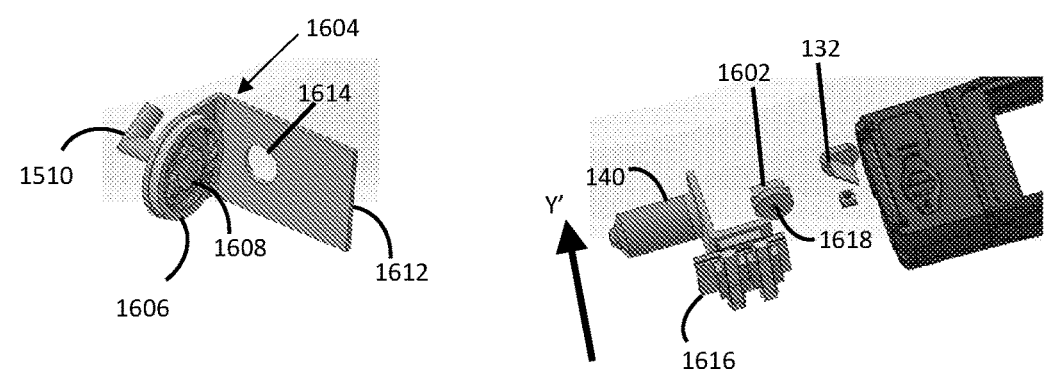
FIG. 16C
FIG. 16D

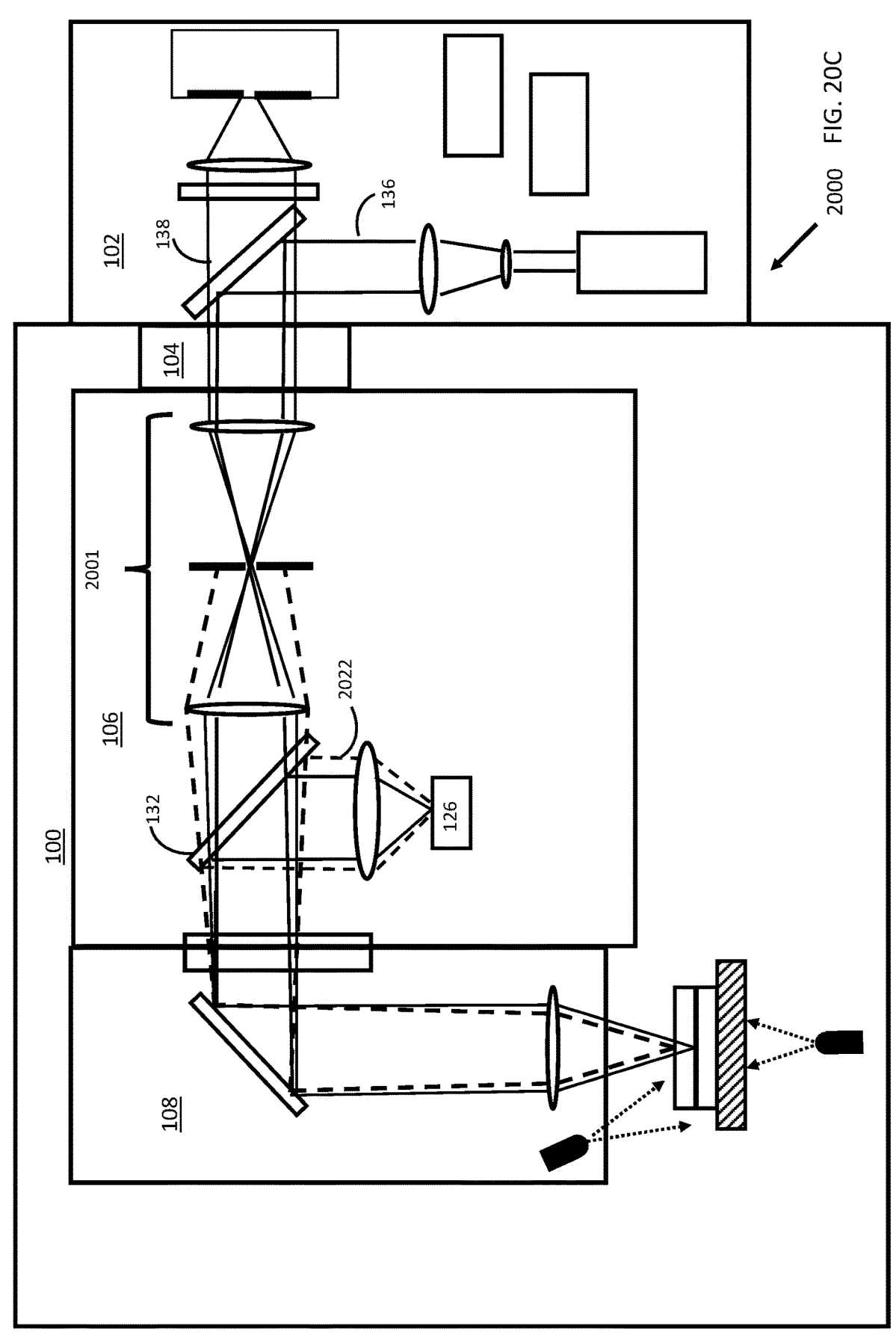
2000 FIG. 20C

2200

100

142

102

132

2018

716

126

2214

104

2218

2038

702

50 um pinhole realigned 2500 ms 650 mA PET only.txt
50 um pinhole realigned 2500 ms 650 mA thru 2 glass slides.txt 25 um pinhole realigned 9000 ms 650 mA PET only.txt
25 um pinhole realigned 9000 ms 650 mA thru 2 glass slides.txt

MODULAR ACCESSORY FOR A RAMAN SPECTROMETER

FIELD OF THE INVENTION

This invention is directed to a portable Raman spectrometer. In particular, a modular accessory for a Raman Spectrometer and its use is described.

BACKGROUND OF THE INVENTION

Portable Raman spectrometers have become a convenient tool for laboratory and field analysis. For example, to ensure product quality and consumer safety, pharmaceutical and biotechnology manufacturers must verify materials throughout production. Handheld Raman analyzers provide a convenient non-destructive point-and-shoot analysis tool that facilitates rapid verification of a broad range of chemical compounds through sealed packaging while minimizing the risk of contamination and exposure to the user.

In most of the current selections of handheld Raman analyzers, the excitation laser beam is emitted straight out of a forward-facing aperture. That is, in a fixed direction which is the optical axis of the Raman spectrometer. This geometry does not allow for easy analysis of small-volume samples, such as a single droplet of a liquid, or for hands-off analysis of samples placed on a horizontal surface, such as puddles or powders.

Another limitation of the current offerings of handheld Raman analyzers is that focusing the Raman excitation light on a small sample through packaging, and collection of the resultant Raman emission light is difficult without visible magnification and manipulation methods. For example, when targeting a specific crystal of a heterogeneous sample through packaging, misalignment can result in Raman emission light from a non-targeted crystal as well as fluorescence from the packaging. The unwanted Raman emission light can obscure the desired signal and add a background that may be difficult to distinguished from the desired Raman emission light.

Accordingly, there remains a need for an improved Raman spectrometer. A portable Raman spectrometer that allows laser excitation, and collection of emission light, to be directed with versatility at different angles to the optical axis is highly desirable. A portable Raman spectrometer having the ability to target a specific area and/or layer of a sample is also highly desirable.

SUMMARY

Systems, methods, and products to address these and other needs are described herein with respect to illustrative, non-limiting, implementations. Various alternatives, modifications and equivalents are possible.

According to a first aspect, a modular accessory for orienting a light path at different angles to an optical axis of a spectrometer, is described. The spectrometer includes an attachment module, a base module, and an objective module.

The attachment module is configured to couple to a Raman spectrometer oriented along an optical axis Z of the Raman spectrometer. Optionally, the Raman spectrometer also includes a user interface oriented substantially for viewing along a secondary axis Y of the Raman spectrometer, and oriented substantially parallel to a plane defined by the optical axis Z and a tertiary axis X of the Raman spectrometer.

The base module includes a visible light imager and is configured to couple to the Raman spectrometer through the attachment module. The base module also includes an input for a sample light beam and a first beam splitter providing bifurcation of the sample light beam. The bifurcation provides a visible light beam directed to the visible light imager and a Raman light beam directed along the optical axis of the Raman spectrometer. The Raman light beam includes a Raman excitation beam from the Raman spectrometer and a Raman emission beam to the Raman spectrometer.

The objective module is coupled to the base module. The objective module includes an objective and is configured to provide an optical path for the sample light beam travelling from a sample along a light path to an objective lens of objective, through the objective, and to the input for the merged light beam of the base module.

Optionally, the objective module is selected from one or more modules each configured to orient the light path perpendicular to a different sample surface. As another option, the attachment module is configured to provide relative rotation between the objective module and the Raman spectrometer about the optical axis of the Raman spectrometer, and wherein the relative rotation provides two or more swivel angle positions, each swivel angle position configured to orient the light path perpendicular to a different sample surface. In another option, the objective module is configured to rotate and provide two or more tilt angle positions, each tilt angle position configured to orient the light path perpendicular to a different sample surface.

Optionally, the objective module includes a sample holder including a transparent portion, wherein the transparent portion is aligned with the light path. Optionally, the modular assembly includes a stage coupled through the Raman spectrometer to the objective module and configured to provide a substantially flat platform for sample placement. Optionally, the modular accessory further includes a confocal assembly.

According to second aspect, a portable Raman system including a Raman spectrometer coupled to the attachment module is described.

According to a third aspect, a method of analysis is described using the portable Raman system is described. The method includes placing a sample in the sample light path of the Raman system.

The modular accessory, when coupled to a Raman spectrometer, provides a portable Raman spectrometer that allows excitation and emission to be directed with geometric versatility. In some options, the accessory also provides the operator of the Raman spectrometer the ability to target a specific area and/or layer of a sample.

BRIEF DESCRIPTION OF THE DRAWINGS

The foregoing and other features and advantages of the present embodiments will be more fully understood from the following detailed description of illustrative embodiments taken in conjunction with the accompanying drawings.

FIG. 1A is a side view; FIG. 1B is a front view.

FIG. 2A shows a first objective module configured to orient the light path perpendicular to a first sample surface. FIG. 2B shows a second objective module configured to orient the light path perpendicular to a second sample surface. FIG. 2C shows a third objective module configured to orient the light path perpendicular to a third sample surface.

FIG. 3A shows an objective module that is configured to orient the light path perpendicular to the first sample surface. FIG. 3B shows an objective module that is configured to orient the light path perpendicular to a second sample surface. FIG. 3C shows an objective module that is configured to orient the light path perpendicular to a third sample surface.

FIG. 8A shows a first swivel angle position. FIG. 8B shows a second swivel angle position. FIG. 8C shows a third swivel angle position. FIG. 8D shows a fourth swivel angle position.

FIGS. 9A-9D are 3D views of a modular accessory mounted to the Raman spectrometer 102, according to implementations with different accessible swivel angles. FIG. 9A shows a down mode. FIG. 9B shows a first side mode. FIG. 9C shows an up mode. FIG. 9D shows a second side mode.

FIG. 11 shows a top view of the modular accessory corresponding to the implementation shown in FIG. 9B.

FIG. 12A shows the modular accessory is oriented in the down mode. FIG. 12B shows the modular accessory is oriented in the up mode.

FIG. 14A, shows a first tilt angle. FIG. 14B shows a second tilt angle. FIG. 14C shows a third tilt angle.

FIGS. 15A-15C are 3D views of the modular accessory mounted to a Raman spectrometer, according to implementations with different accessible tilt angles. FIG. 15A shows a forward mode. FIG. 15B shows an up mode. FIG. 15C shows a down mode.

FIGS. 16A-16C are views of the modular accessory, according to the implementation shown by FIGS. 15A-15C. FIG. 16A shows a cross-cut view of the down mode. FIG. 16B shows a cross-cut view of the forward mode. FIG. 16C shows a gear system of the modular accessory. FIG. 16D shows other internal components of the modular accessory.

FIG. 17A shows the modular accessory oriented in a down mode. In FIG. 17B shows the modular accessory oriented in an up mode.

FIGS. 20A-20D are schematic diagrams of the modular accessory, according to some implementations. FIG. 20A includes a confocal assembly positioned in an objective module. FIG. 20B includes a confocal assembly positioned in a base module before a light imager. FIG. 20C includes a confocal assembly positioned in the base module after the light imager. FIG. 20D includes a visible light source for illuminating the sample.

FIG. 21A is an image of the Raman system. FIG. 21B is a crosscut view of the Raman system.

FIG. 22A shows a magnified visual image of a sample collected by the Raman system. FIG. 22B shows Raman spectra that were collected from the sample using the Raman system FIG. 23A shows a layered sample. FIG. 23B shows the resultant Raman spectra when a slit is selected for the analysis. FIG. 23C shows the resultant Raman spectra when a first pinhole is selected.

Figure 1A:
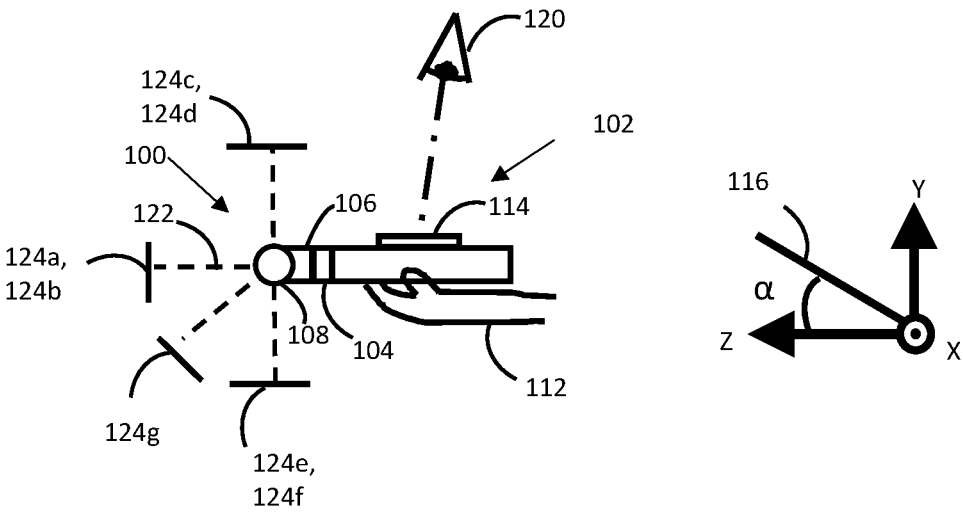
FIGS. 1A and 1B are diagrammatic depictions of a modular accessory coupled to a portable Raman spectrometer, according to some implementations.

The figures referred to above are not drawn necessarily to scale, should be understood to provide a representation of particular embodiments, and are merely conceptual in nature and illustrative of the principals involved. The same reference numbers are used in the drawings for similar or identical components and features shown in various alternative embodiments.

DETAILED DESCRIPTION

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the statistical dispersion found in their respective testing measurements.

Figure 1B:
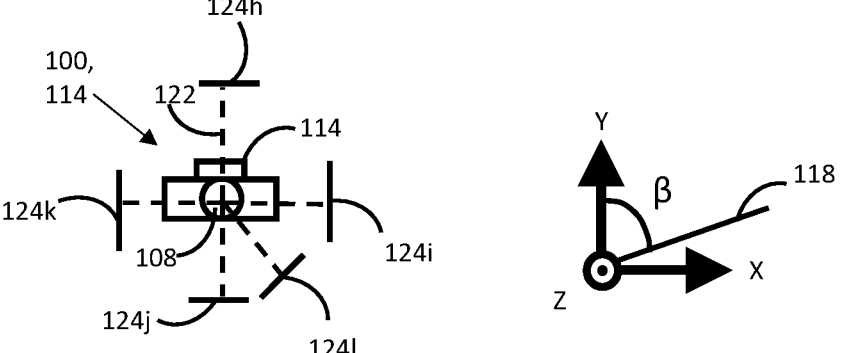

FIGS. 1A and 1B are diagrammatic depictions of a modular accessory 100 coupled to the front of the portable Raman spectrometer 102, according to some implementations. The modular accessory 100 includes an attachment module 104, a base module 106, and an objective module 108 coupled to the base module. The attachment module 104 is connected at a front end of the Raman spectrometer 102 oriented along the optical axis Z. The Raman spectrometer 102 is configured as a handheld device, where a left hand 112 is indicated holding the device.

The orientations, as distinct from the location, of the mutually orthogonal optical axis Z, secondary axis Y, and tertiary axis X of the Raman spectrometer 102 are indicated. FIG. 1A is a side view where X points out of the page; FIG. 1B is a front view where Z points out of the page. It is noted that, for figure clarity, the location of the optical axis is not indicated, since the optical axis would pass through the center of the objective module 108 (FIG. 1B). A tilt or flip angle $\alpha$ is defined as shown relative to a line 116 in FIG. 1A, and a swivel angle $\beta$ is defined as shown relative to a line 118 in FIG. 1B.

The Raman Spectrometer includes a user interface 114. The user interface 114 can include a screen for viewing by a user 120. The interface can also include other input or output devices, such as a keypad, touch screen, joystick, or audible devices (e.g., speaker or microphone). The attachment module 104 is also positioned so that the user interface 114 is oriented substantially for viewing along the secondary axis Y of the Raman spectrometer 102. The user interface 114 is also oriented substantially in a plane parallel to a plane defined by the optical axis Z and the tertiary axis X. The orientation along secondary axis Y allows the user 120 to see and interact with the user interface 114. The orientation in the plane substantially parallel to the plane defined by the optical axis Z and tertiary axis X is so that numbers, letters, or other data representations are correctly oriented on the user interface-whether it is a view screen, keypad, touch screen, joy stick, or other interface where orientation is important (e.g., the orientation of audible devices may not matter). The orientation of the user interface 114 can deviate from exactly parallel to the XZ plane, such that the user interface or a component of the user interface (e.g., a viewing screen) can be oriented with tilt angle $\alpha$ that is greater than 0 deg, such as an angle between about 0 and 45 degrees. In some implementations, the tilt angle $\alpha$ of the user interface is less than about 10 degrees. Similarly, the orientation of the user interface can deviate from exactly parallel to the XZ plane with $\beta$ between about 0 and 10 degrees.

As shown in FIG. 1A, the attachment module 104 connects or couples the Raman spectrometer 102 to the base module 106. As used herein and throughout this description "coupled," "coupling," or "coupled" refers to one or more of a mechanical, electrical, and optical coupling.

The objective module 108 is configured to provide a light path 122, shown as dashed line. The light path 122 is oriented perpendicular to a sample surface. Several sample surfaces are illustrated in FIG. 1A: a first sample surface 124a and eight sample surface 124b; a second sample surface 124c and a ninth sample surface 124d; a third sample surface 124e and a tenth sample surface 124f; and an eleventh sample surface 124g. Similarly, several sample surfaces are illustrated in FIG. 1B: a fourth sample surface 124h; a fifth sample surface 124i; a sixth sample surface 124j; a seventh sample surface 124k; and a twelfth sample surface 124l. The objective module 108 is configured to provide one light path at a time to one of the sample surfaces.

As used herein a "sample surface" relates to a geometric construction rather than a surface of a sample. That is, a sample surface as used herein is defined to be a flat plane having a facing side but no specific thickness or topography. For example, the second sample surface 124c faces the third surface 124e; and a line from the objective module 108 to the first sample surface 124a is parallel to the optical axis Z of the Raman spectrometer 102-said line being the light path 122 that is perpendicular to the first sample surface 124a. In contrast, a surface of a sample can be substantially flat, but can also have topography, be curved, and have roughness.

FIG. 1A illustrates that each of the light paths 122 can also be defined by the tilt angle $\alpha$. FIG. 1B illustrates that each light path 122 can also be defined by the swivel angle $\beta$. In some implementations, the light path is defined by a combination of the tilt angle $\alpha$ and the swivel angle $\beta$ (see for example the implementations described with respect to FIG. 19).

Figure 1C:
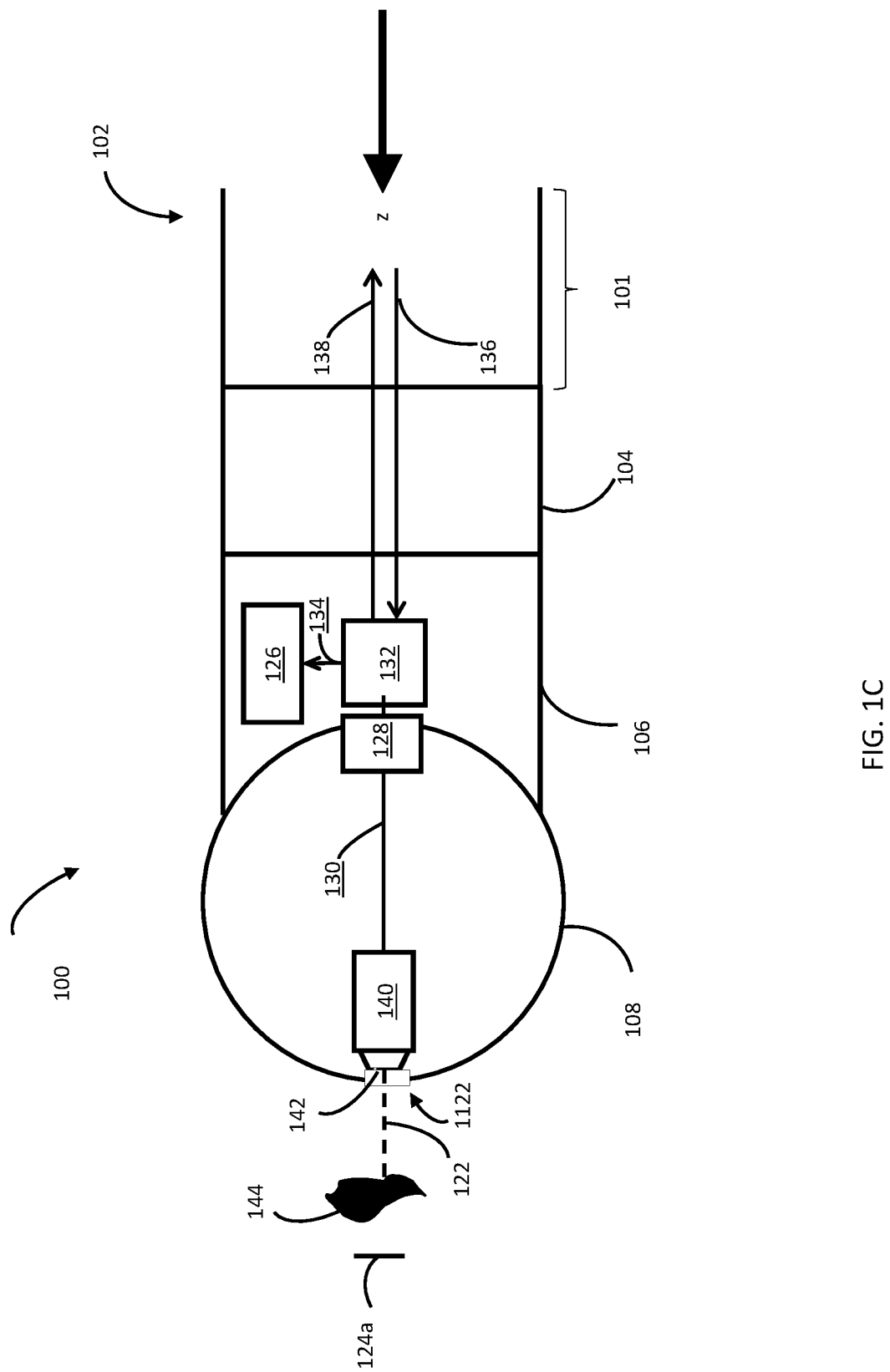
FIG. 1C illustrates optical components and light paths in the modular accessory, according to some implementations.

FIG. 1C illustrates optical components and light paths in the modular accessory 100 and a front portion 101 of the Raman spectrometer 102, according to some implementations. In FIG. 1C the optical axis Z location and direction are shown. The base module 106 includes a visible light imager 126. In some implementations, the visible light imager 126 includes a CMOS camera. In some implementations, the visible light imager 126 includes a CCD camera. In some implementations, the visible light imager includes one or more focusing optics. The base module also includes an input 128 for a sample light beam 130. The input 128 can be an opening, or a path through a material that is transparent to the sample light beam 130.

In some implementation, the base module 106 and the objective module 108 are non-reversibly or irreversibly coupled. In some other implementation, the base module 106 and the objective module 108 are reversibly coupled. In some implementation, the attachment module 104 and the base module 106 are non-reversibly or irreversibly coupled. In some other implementation, the attachment module 104 and the base module 106 are reversibly coupled. In some implementation, the attachment module 104, the base module 106, and the objective module are non-reversibly or irreversibly coupled. In some other implementation, the attachment module 104, the base module 106, and the objective module are reversibly coupled.

As used herein "non-reversibly" coupled or "irreversibly" coupled means that the two or more module (or elements or components) referred to cannot be separated without damaging one or more of the modules. Examples of irreversibly coupled modules can include that the one or more of the modules are cast from a single mold, cut or shaped from a single piece of material, are glued together, are 3D printed as a single part, or are welded together. This contrasts with a "reversibly" coupled, which implies the two or more modules or components referred to can be separated without damaging the modules. Examples of reversibly coupling include coupling of one or more components using pins, holes, nuts, bolts, screws, rails, grooves, mechanical latches, snap fitting, and compression fittings. In some implementations, a tool is required to de-couple reversibly coupled modules. In some implementations, reversibly coupled modules can be de-coupled by hand without any additional tool.

The base module 106 also includes a first beam splitter 132. Bifurcation by the first beam splitter 132 provides a visible light beam 134 directed to the visible light imager 126, and a Raman light beam including a Raman excitation beam 136 from the Raman spectrometer, and a Raman emission beam 138 to the Raman spectrometer.

The objective module 108 includes an objective 140 including an objective lens 142. The objective 140 provide an optical path for the sample light beam 130, travelling from a sample 144 along the light path 122 to the objective lens 142, through the objective 140, and to the input 128 for the sample light beam 130 of the base module 106. In some implementations, the objective module 108 includes an aperture 1122 defined in an outer wall of the objective module 108. In the shown orientation, the first sample surface 124a is perpendicular to the sample light beam 130. It is noted that the first sample surface 124a is not a surface in the sample 144 and, as previously described the first sample surface 124a is a geometric construction. The objective 140 can be configured to magnify the sample. In some implementations, the objective lens provides a magnification of at least 10 times (e.g., at least 20 times, at least 30 times, at least 40 times, at least 50 times, at least 100 times).

Figure 2A:
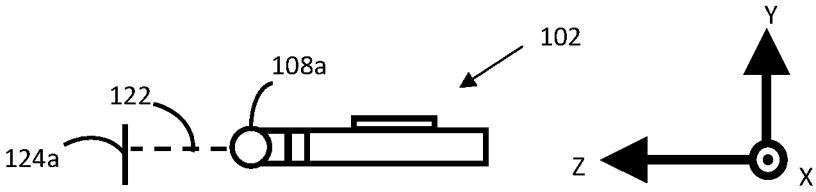
FIGS. 2A-2C illustrate objective modules selected to orient a light path perpendicular to a different sample surface, according to some implementations.
Figure 2B:
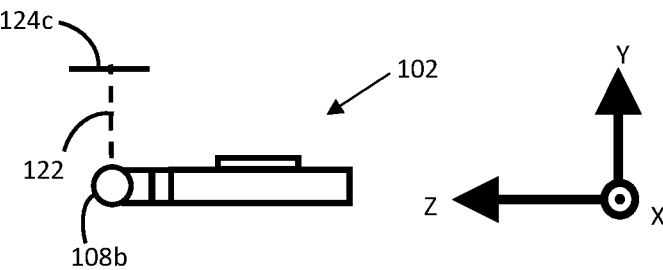
Figure 2C:
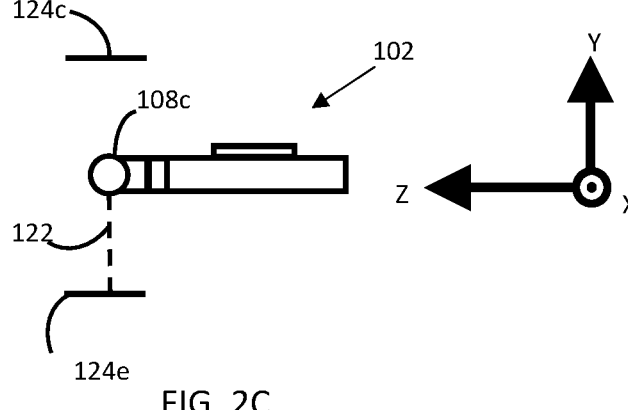

In some implementations, the objective module 108 is selected from one or more modules each configured to orient the light path 122 perpendicular to a different sample surface, as illustrated by FIGS. 2A-2C. The direction of axis X, Y and Z are indicated. As shown in FIG. 2A, in some implementations, a first objective module 108a is configured to orient the light path 122 perpendicular to the first sample surface 124a, wherein the light path is parallel to the optical axis Z of the Raman spectrometer 102. In some other implementations, as shown in FIG. 2B, a second objective module 108b is configured to orient the light path 122 perpendicular to the second sample surface 124c, wherein the light path 122 is parallel to the secondary axis Y of the Raman spectrometer 102. FIG. 2C shows yet another implementation, where a third objective module 108c is configured to orient the light path 122 perpendicular to the third sample surface 124e, wherein the light path is parallel to the secondary axis Y of the Raman spectrometer 102, and wherein the third sample surface 124e faces the second sample surface 124c.

Figure 3A:
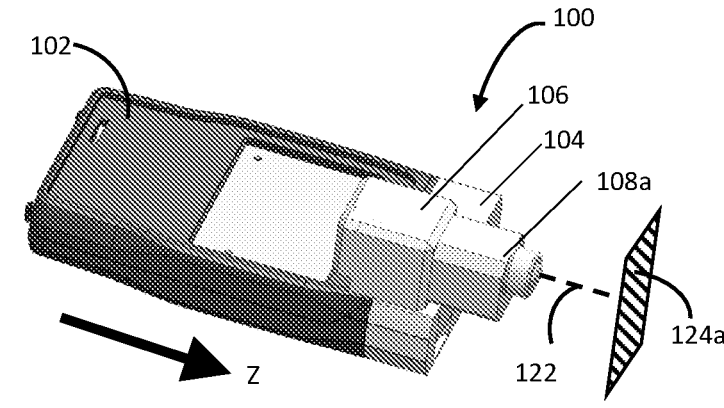
FIGS. 3A-3C are 3D views of modular accessories mounted to a Raman spectrometer 102, according to some implementations.
Figure 3B:
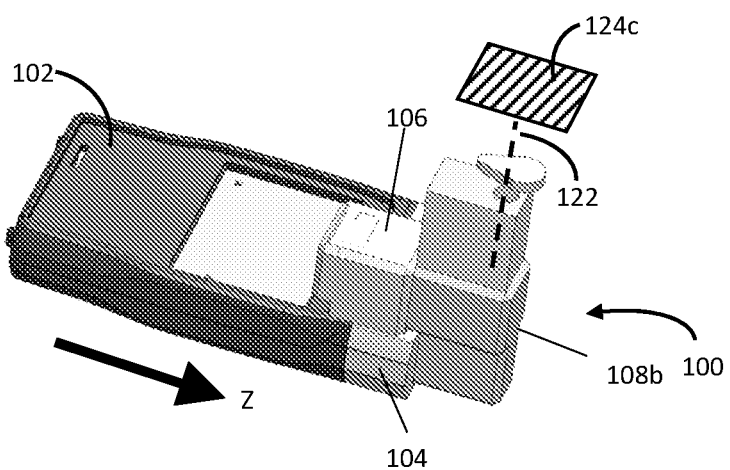
Figure 3C:
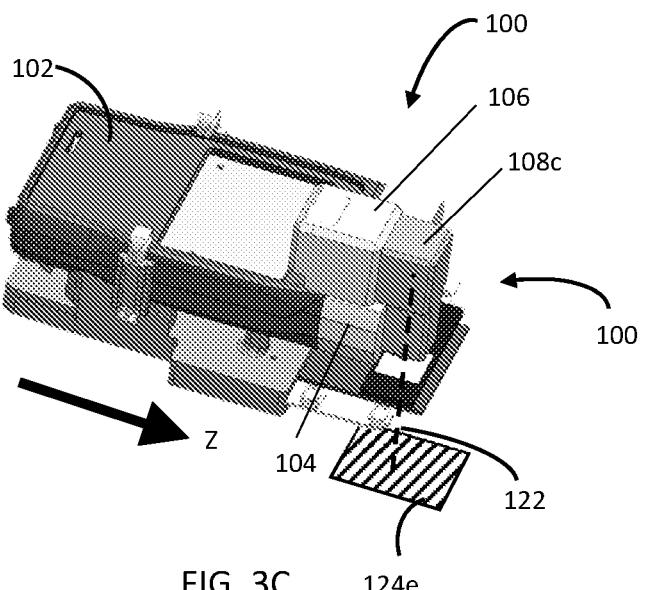

FIGS. 3A-3C are 3D views of the modular accessory 100 mounted to the Raman spectrometer 102, according to some implementations. The attachment module 104 couples the base module 106 to the Raman spectrometer 102. In FIG. 3A the objective module 108a is coupled to the base module 106, and the objective module 108a is configured to orient the light path 122 perpendicular to the first sample surface 124a. In FIG. 3B the objective module 108b is coupled to the base module 106, and the objective module 108b is configured to orient the light path 122 perpendicular to the second sample surface 124c. In FIG. 3C the objective module 108c is coupled to the base module 106, the objective module 108c is configured to orient the light path 122 perpendicular to the third sample surface 124e.

Figure 4A:
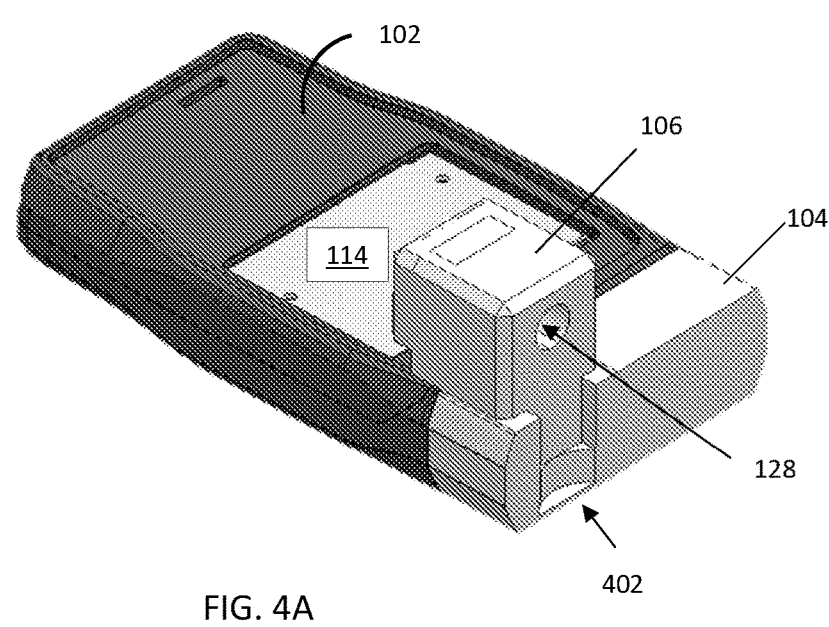
FIG. 4A is a 3D view of an attachment module and base module coupled to a front end of a Raman spectrometer, according to some implementations.
Figure 4B:
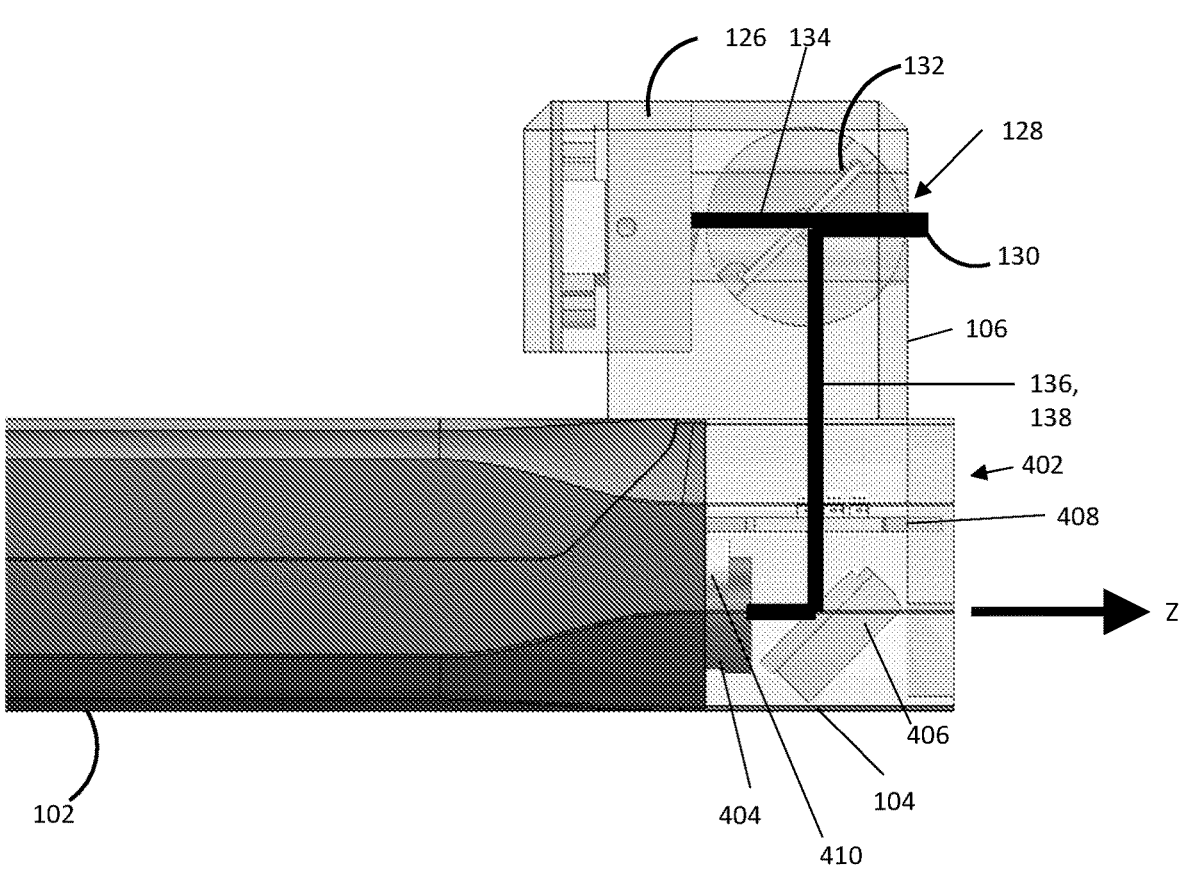
FIG. 4B is a side view of the attachment module and the base module attached to the front end of the Raman spectrometer.

FIG. 4A is a 3D view of the attachment module 104 and the base module 106 coupled to the Raman spectrometer 102. A slot 402 is included as part of a mechanical coupling element, other mechanical coupling elements are described below (FIG. 4B). Input 128 for the sample light beam 130 is also shown and is formed as an opening in a wall of the base module 106. In some implementations, the attachment module 104 and the base module 106 are non-reversibly attached. In some other implementations, the attachment module 104 and the base module 106 are reversibly attached. The user interface 114 is also shown.

FIG. 4B is a side view of the attachment module 104 and the base module 106 attached to a front end of the Raman spectrometer 102. Outer walls of the attachment module 104 and the base module 106 are shown in a transparent view to show internal components. Internal components include the first beam splitter 132, which in this implementation is configured as a dichroic mirror. Sample light beam 130 enters the base module 106 through the input 128. The first beam splitter 132 provides a bifurcation of the sample light beam 130 into the visible light beam 134 and the Raman light beam 136, 138. The visible light beam 134 is directed to the visible light imager 126, which is configured as a camera, such as a CCD camera or CMOS camera, and can include additional optics such as for focusing and relaying light. The Raman excitation beam 136 is provided through a cone 404 of the Raman spectrometer 102 along the optical axis Z. The Raman emission beam 138 enters the Raman spectrometer 102 though the cone 404. In this implementation, a first mirror 406 is used as part of an optic relay to direct the Raman light beam 136,138 to and from the Raman spectrometer 102.

A coupling element 410, configured as a recessed bolt, couples the attachment module 104 to the Raman spectrometer 102. The slot 402 is also indicated. Part of a PC board 408 is also shown protruding out of the front of the Raman spectrometer 102. The PC board 408 includes or is connected to a CPU of the Raman spectrometer 102. Other components in the Raman spectrometer 102, such as random access and read only memory, communication and charging ports (e.g., wireless and hardwired), a power source, and the user interface 114 (FIG. 4A) can be connected to the PC board 408. The PC board is also electrically connected to the visible light imager 126 so that electrical signals or visualization data can be sent to the CPU of the Raman spectrometer 102. The PC board is positioned out of the path of the Raman emission/excitation beam 136,138. In some implementations, a Raman light transparent path through the PC board for the Raman light beam 136,138 can be provided. Actuators and motors in the modular accessory 100 can also be connected to the PC board and controlled through the user interface 114.

Figure 5A:
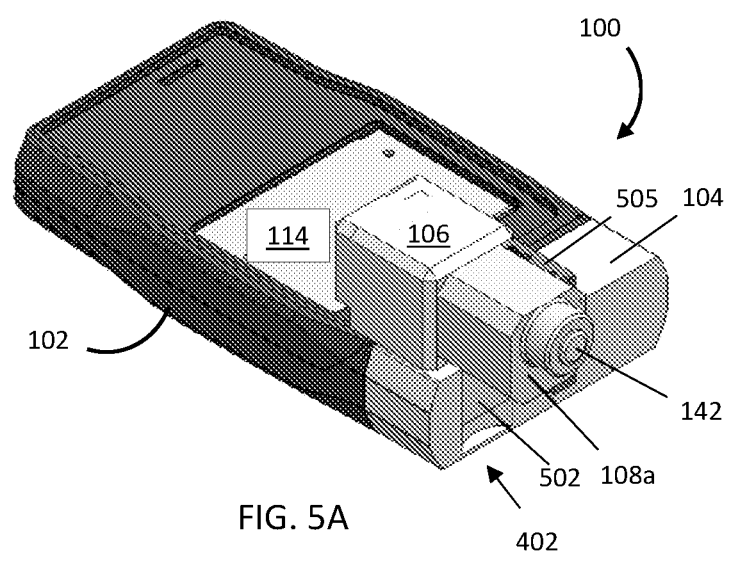
FIG. 5A is another 3D view of the modular accessory coupled to the Raman spectrometer, according to the implementation shown in FIG. 3A.

FIG. 5A is another 3D view of the modular accessory 100 coupled to the Raman spectrometer 102, according to the implementation shown in FIG. 3A. The objective module 108a is shown including the objective lens 142. The slot 402 is shown. The objective module 108a includes a tongue or rail 502 configured to fit into the slot 402, thereby coupling the objective module 108a to the base module 106, at least partially through the attachment module 104. Additional coupling elements can be included. For example, one or more bolts attaching the objective module 108a to the base module 106, or one or more bolts attaching the objective module 108a to the attachment module 104. The user interface 114 is also indicated in the figure. An objective actuator 505 is indicated.

Figure 5B:
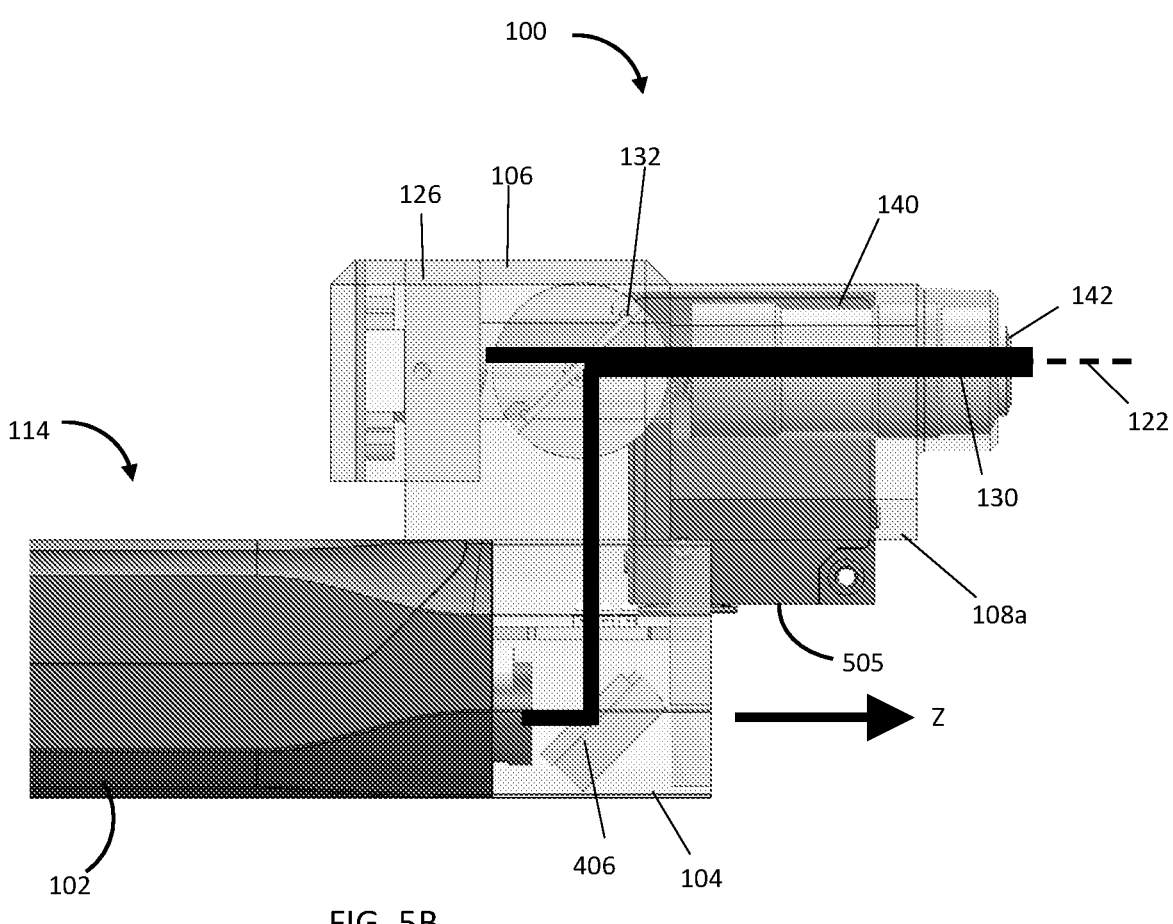
FIG. 5B is a side view of the modular accessory.

FIG. 5B is a side view of the modular accessory 100 coupled to the Raman spectrometer 102, according to the implementation shown in FIG. 5A, where outer walls of the attachment module 104, base module 104, and objective module 108a are shown in a transparent view. The objective module 108a includes the objective 140, including the objective lens 142. The objective 140 is coupled to the objective actuator 505. The objective actuator 505 includes a motor and controls movement in the Z direction for the objective 140 for focusing. The sample light beam 130 is shown passing through the objective lens 142, through the objective 140, and into the base module 106. Other components as previously described such as the first beam splitter 132, the visible light imager 126, and the first mirror 406 are also shown.

The implementations of the modular accessory 100 described with respect to FIGS. 3A, 5A and 5B provide a point and shoot orientation. For example, a user can hold or position the spectrometer to view and interact with the user interface 114 while analyzing a sample positioned in the light path 122.

Figure 6A:
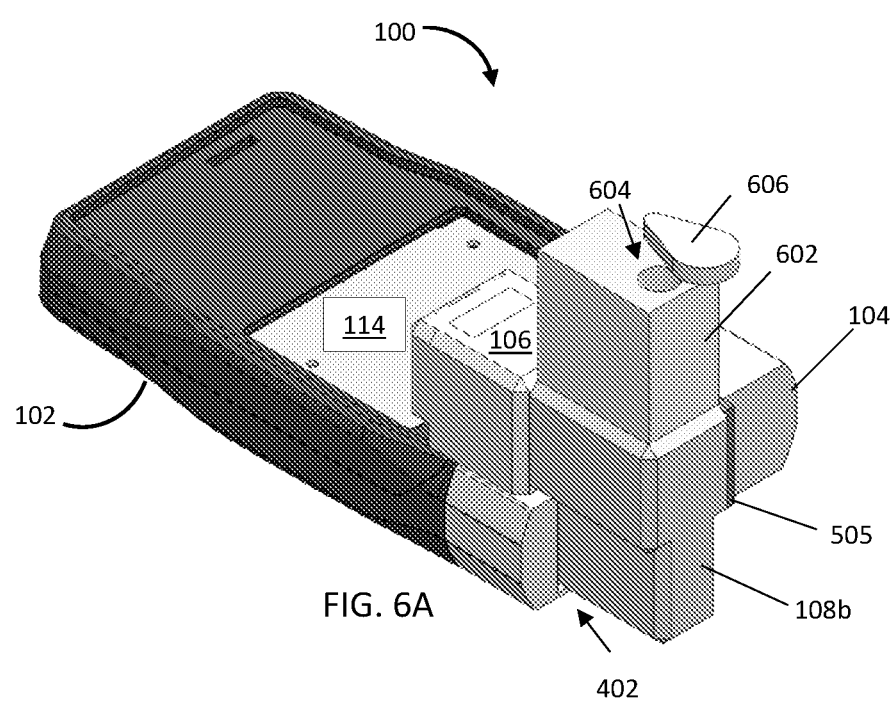
FIG. 6A is another 3D view of the modular accessory coupled to the Raman spectrometer 102, according to the implementation shown in FIG. 3B.

FIG. 6A is another 3D view of the modular accessory 100 coupled to the Raman spectrometer 102, according to the implementation shown in FIG. 3B. The objective module 108b can be coupled to the base module 106 and the attachment module 104 as previously described, for example through the slot 402 and other coupling elements. The objective actuator 505 is shown. In some implementations, the objective module 108b is coupled to a sample holder 602. A top aperture 604 to the sample holder 602 is indicated. The movable cover 606 can be positioned to cover the top aperture 604. In some implementations, the sample holder 602 is reversibly coupled to the objective module 108b. In some other implementations, the sample holder 602 is irreversibly coupled to the objective module 108b.

Figure 6B:
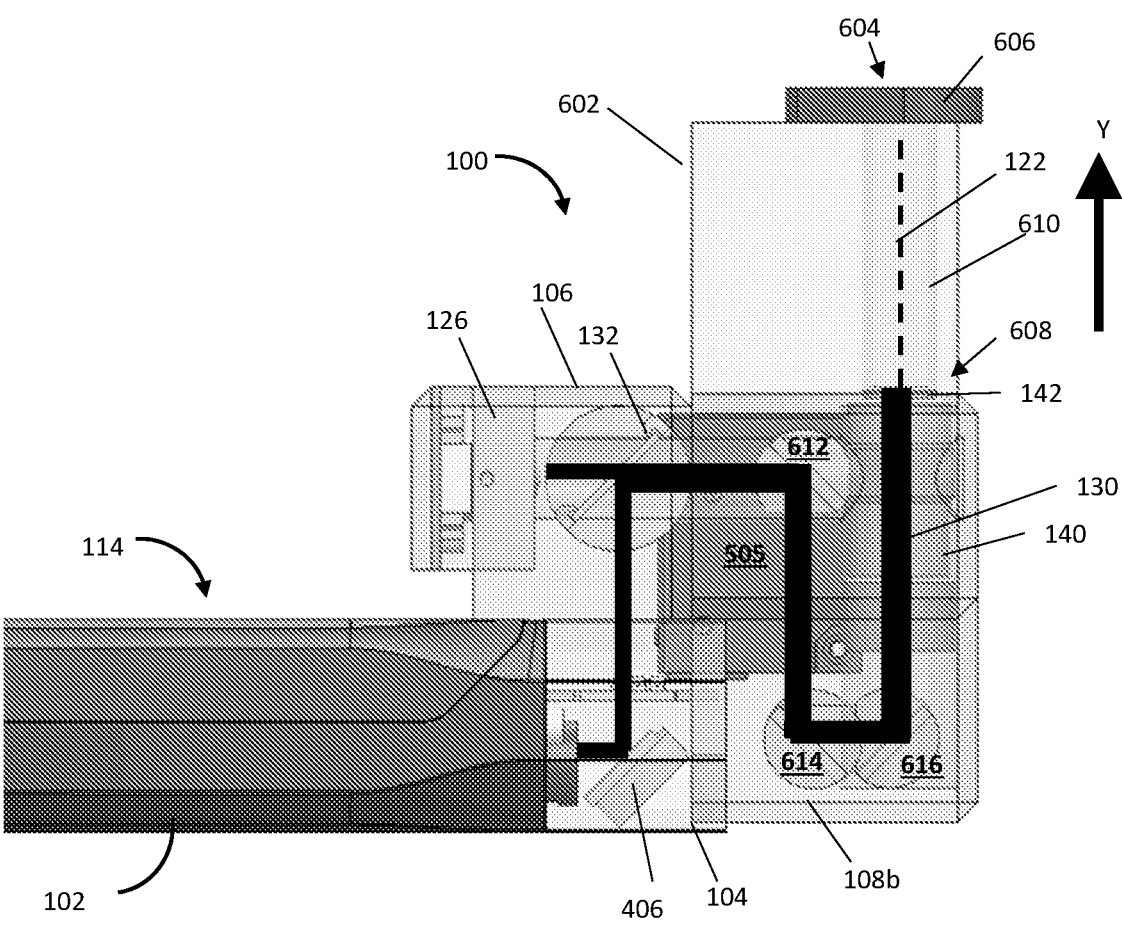
FIG. 6B is a side view of the modular accessory.

FIG. 6B is a side view of the modular accessory 100 coupled to the Raman spectrometer 102, according to the implementation shown in FIG. 6A, where outer walls of the attachment module 104, base module 104, objective module 108b, and the sample holder 602 are shown in a transparent view. The objective actuator is configured to move the objective lens in the Y direction. Some of the previously described elements, such as the first mirror 406, the first beam splitter 132, and the visible light imager 126 are indicated.

The objective module 108b includes the objective 140 having the objective lens 142 positioned proximate to the bottom of the sample holder 602, aligned with a transparent portion 608 in a bottom wall of the sample holder 602. The transparent portion 608 is opposite top aperture 604. The transparent portion 608 can be a window made of a visible and Raman light transparent material, including air (i.e., an opening). The aperture 604 extends down, in the −Z direction, through the sample holder 602, to the transparent portion 608. The transparent portion 608 and the aperture 604 thereby define a space 610. The space 610 is configured to accommodate a sample, through the top aperture 604, where the sample can be in a vial or directly placed in the space 610. A second mirror 612, a third mirror 614 and a fourth mirror 616 form an optic relay to orient the sample light beam 130 from the objective lens 142 to the first beam splitter 132.

The implementations of the modular accessory 100 described with respect to FIGS. 3B, 6A and 6B provide an inverted microscope orientation. For example, a user can position the sample holder 602 on the objective module 108b and place a sample in the space 610. The user can hold the Raman spectrometer 102 to view and interact with the user interface 114 while positioning a sample in the light path 122. Gravity holds the sample, such as a power or liquid, towards the bottom of the space 610. In some implementations, the sample can be positioned in the space in a container, such as a vial having a transparent bottom.

Other implementations for use of the modular accessory 100 in the inverted microscope orientation are contemplated. For example, a sample, such as a powder or drop, can be directly placed or positioned on the objective lens 142. In some implementations, the sample is placed in a container such as a vial or bag, while in other implementations, the sample is place on a transparent surface such as a microscope slide, where the sample is viewed through the slide.

Figures 7A, 7B:
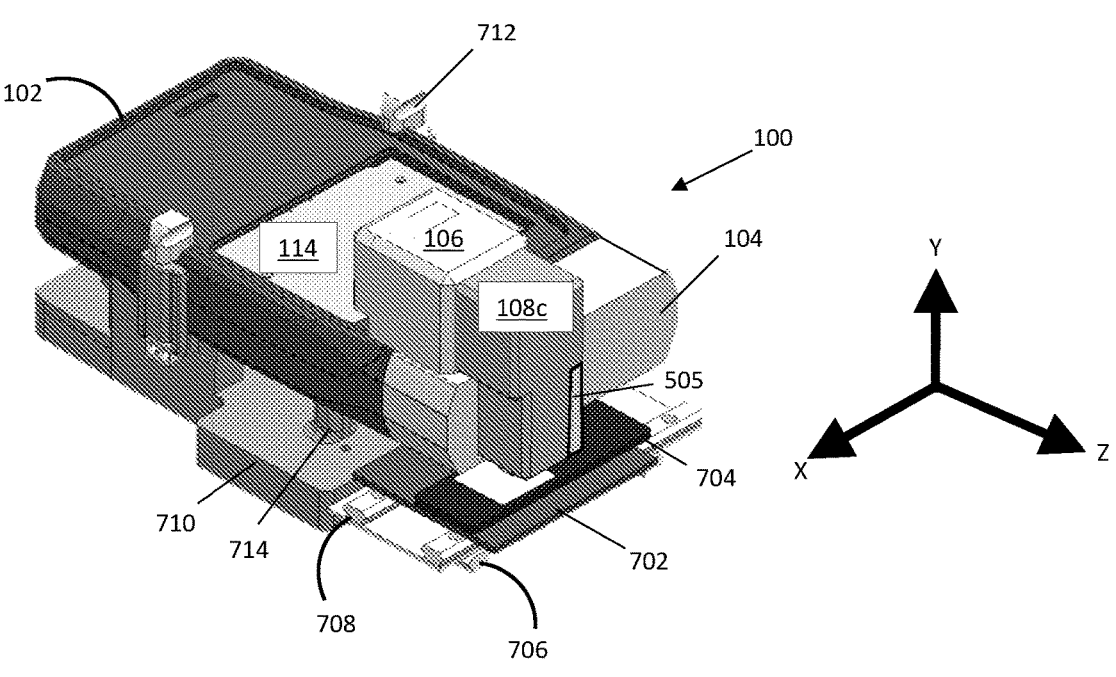
FIG. 7A is another 3D view of the modular accessory coupled to the Raman spectrometer, according to the implementation shown in FIG. 3C.
FIG. 7B is a side view of the modular accessory.

FIG. 7A is another 3D view of the modular accessory 100 coupled to the Raman spectrometer 102, according to the implementation shown in FIG. 3C. The objective module 108c can be coupled to the base module 106 and attachment module 104 as previously described. In some implementations, the modular accessory 100 includes a stage 702 coupled through the Raman spectrometer 102 to the objective module 108c. A coupler 710 is configured as a platform that can be placed on a surface (e.g., a benchtop or a hand) and includes fasting elements 712 and posts 714 to position the stage 702 relative to the objective module 108c. In some implementations, the stage is removably coupled to the Raman spectrometer 102, while in other implementations the stage is irremovably coupled to the Raman spectrometer 102.

The stage 702 is configured to provide a substantially flat platform for sample placement, such as a microscope slide 704. The stage 702 is coupled to a first actuator 706 including a first rail to provide movement in the Z direction, and the stage is couple to a second actuator 708 including second rail to provide movement in the X direction. The objective module 108c includes the objective actuator 505. In some implementations, the stage includes a third actuator (not shown in this implementation) for relative movement in the Y direction. The actuators can include an electric motor for movement, or a manual lever or screw mechanism for movement. In implementations with electric motor driven actuators (e.g., a stepper motor), these can be electrically connected and controlled by the CPU of the Raman spectrometer 102 through the user interface 114.

FIG. 7B is a side view of the modular accessory 100 coupled to the Raman spectrometer 102, according to the implementation shown in FIG. 7A, where outer walls of the attachment module 104, the base module 106, and objective module 108c are shown in a transparent view. Some of the previously described elements, such as the first mirror 406, the first beam splitter 132, and the visible light imager 126 are indicated. The coupler 710, the first actuator 706, the second actuator 708, the stage 702 and the microscope slide 704 are also are shown. A fifth mirror 716, which can be included as part of an optic relay, orients the sample light beam 130 through the objective 140 and the objective lens 142. The objective actuator 505 provides movement of the objective 140 in the Y direction. The stage 702 provides a platform that is parallel to the third sample surface 124*e*.

The implementations of the modular accessory 100 described with respect to FIGS. 3C, 7A and 7B provide a microscope orientation. This designation is attributed to a use which is similar to a traditional Raman microscope configuration. That is, the stage 702 can be moved in orthogonal X, Z directions to view a sample on the microscope slide 704, while the sample is brought into focus by relative movement between the objective lens 142 and the sample on the microscope slide 704. The sample can be viewed by a screen component of the user interface 114.

In some implementations, the stage 702 can be coupled to the modular accessory 100 described with respect to FIGS. 3B, 6A and 6B provide an inverted microscope orientation. For example, the coupler 710 is positioned on the same side as the user interface 114. In such an implementation, user access to the user interface 114 would be provide, such as by an opening. In addition, the stage 702 would be transparent in the light path 122. Similarly, the actuators would be positioned so as not to obscure the light path 122 from the sample to the objective lens 142. Such a configuration can be used to view a sample, from underneath, such as at the interface of the sample and the microscope slide 704.

In some implementations, the attachment module 104 is configured to provide relative rotation between the objective module 108 and the Raman spectrometer 102 about the optical axis Z of the Raman spectrometer 102 (FIG. 1C). The relative rotation provides two or more swivel angle $\beta$ positions, each swivel angle $\beta$ position configured to orient the light path 122 perpendicular to a different sample surface (FIG. 1B).

Figures 8A, 8B:
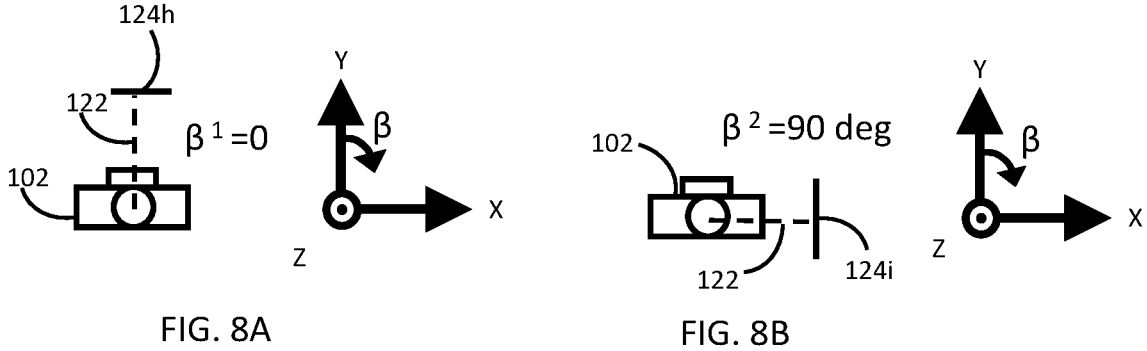
FIGS. 8A-8D show some different swivel angle positions that, can be achieved by the modular accessory according to some implementations.
Figure 8C:
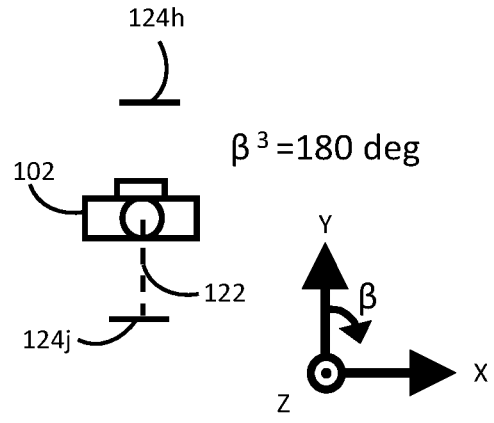
Figure 8D:
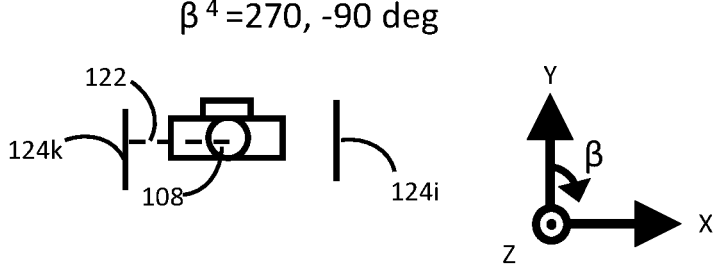

FIGS. 8A-8D show some different swivel angle $\beta$ positions that, without limitation, can be achieved. FIG. 8A shows a first swivel angle position ($\beta^1$=0) that orients the light path 122 parallel to the secondary axis Y of the Raman spectrometer 102 and perpendicular to the fourth sample surface 124*h*. FIG. 8B shows a second swivel angle position ($\beta^2$=90 deg) that orients the light path 122 parallel to the tertiary axis X of the Raman spectrometer 102 and perpendicular to the fifth sample surface 124*i*. FIG. 8C shows a third swivel angle position ($\beta^3$=180 deg) that orients the light path 122 parallel to the secondary axis Y of the Raman spectrometer 102 and perpendicular to the sixth sample surface 124*j*, wherein the sixth sample surface 124*j* faces the fourth sample surface 124*h*. FIG. 8D shows a fourth swivel angle position ($\beta^4$=270 deg, −90 deg) that orients the light path 122 parallel to the tertiary axis X of the Raman spectrometer 102 and perpendicular to the seventh sample surface 124*k*, wherein the seventh sample surface 124*k* faces the fifth sample surface 124*i*. Other implementations include any angle of $\beta$ between 0 and 360 degrees for orientation of the light path 122.

FIGS. 9A-9D are 3D views of the modular accessory 100 mounted to the Raman spectrometer 102, according to implementations with different accessible swivel angles $\beta$. The optical axis Z direction and approximate location is indicated. In this implementation, the objective module 108 and the base module 106 form an integrated unit contained in a single housing 902. The attachment module 104 is configured to allow rotation of the base module 106, and the objective module 108, around the optical axis Z. FIG. 9A shows a down mode ($\beta^3$=180 deg). FIG. 9B shows a first side mode ($\beta^4$=270, −90 deg). FIG. 9C shows an up mode ($\beta^1$=0 deg). FIG. 9D shows a second side mode ($\beta^2$=90 deg). FIGS. 9A and 9C show the position of the objective lens 142. FIG. 9A shows the light path 122 perpendicular to the sixth sample surface 124*j*. FIG. 9B shows the light path 122 perpendicular to the seventh sample surface 124*k*. FIG. 9C shows the light path 122 perpendicular to the fourth sample surface 124*h*. FIG. 9D shows the light path 122 perpendicular to the fifth sample surface 124*i*.

Figure 10:
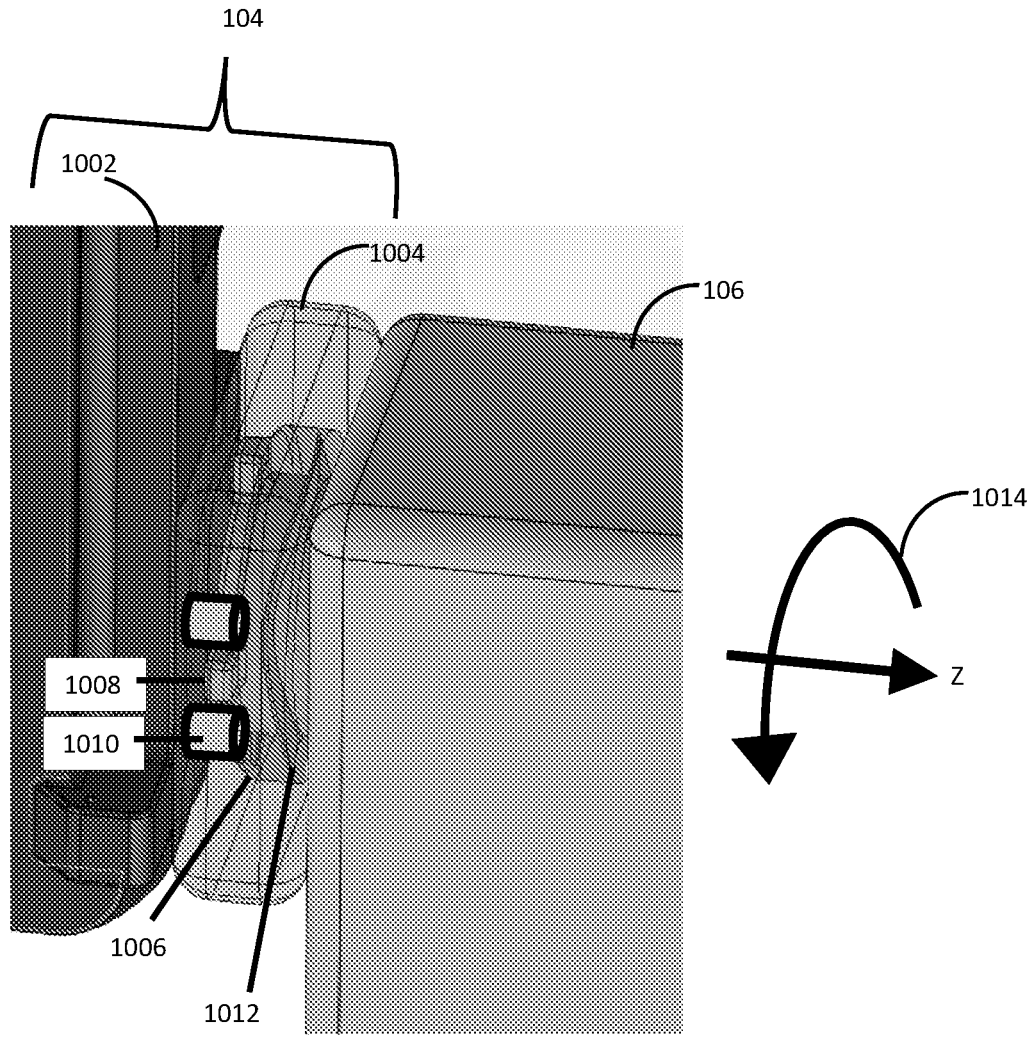
FIG. 10 shows a detailed partial view of the attachment module, according to the implementations shown in FIGS. 9A-9D.

FIG. 10 shows a detailed partial view of the attachment module 104, according to the implementations shown in FIGS. 9A-9D. The attachment module 104 includes a first portion 1002, partially shown, that couples to the Raman spectrometer 102 (FIG. 9A). The attachment module 104 also includes a second portion 1004, partially shown, that couples to the base module 106. The second portion 1004 is shown with transparent outer walls, revealing interior components of a ratchet mechanism. The ratchet mechanism includes a first gear 1006 that is fixed relative to the second portion 1004 and can rotate about the optical axis Z along a path defined by the arc 1014. The first gear 1006 includes teeth 1008 that can lock into one or more rigid elements 1010 that are fixed relative to the first portion 1002. A wave spring 1012 keeps the teeth between the rigid elements 1010, where a user can pull the base module away from the attachment module to clear the rigid elements 1010 and allow rotation about the central axis. In some implementations, the rigid elements 1010 can be comprised in a second gear aligned to Z and meshing with the first gear.

The swivel angle positions $\beta$ are determined by the number and spacing of the teeth 1008 and the rigid elements 1010. In some implementations, at least 3 teeth or corresponding rigid elements 1010 are used so that three different swivel angles $\beta$ can be accessed. In some implementations, friction between a fixed surface relative to the first portion and a fixed surface relative to the second portion are used to hold swivel angle positions. In such implementations, any angle position $\beta$ can be achieved. In some implementations, at least 4, 5, 6, 7, 8, 16, 20 or 24 teeth or corresponding rigid elements 1010 are used.

In some implementations, the angle position $\beta$ is constrained by elements other than those in the second portion 1004. For example, in some implementations, electrical wires and wire bundles are passed through the second portion 1004. In such implementations, the angle position may be constrained to less than 360 degrees to avoid twisting and stressing the wires or wire bundle. In some other implementations, an electrical connection is made so that continuous electrical connection can be made between the attachment module 104 and the base module 106. For example, an electrical connection can be made through the wave spring 1012 and an opposing conductive surface on the first portion, or electrical connection can be made by a conductive bearing or rail.

FIG. 11 shows a top view of the modular accessory 100 corresponding to the implementation shown in FIG. 9B. The housing 902 is shown in a transparent view to show the visible light imager 126, the first beam splitter 132 and the objective 140. Sample light beam 130 passes through the objective 140, and the first beam splitter 132 sends the visible light beam 134 to the visible light imager 126, and the Raman light beam 136,138 to the Raman spectrometer 102 through a light path 1102 in the attachment module 104. The light path is indicated by bounding dotted lines and can be a transparent channel aligned with optical axis Z through the first portion 1004 and the second portion 1002, and to the cone 404 of the Raman spectrometer 102 (FIG. 4B). In some implementations wires or wire bundles pass through a channel adjacent to the light path 1102.

In the implementation shown by FIG. 11, the objective actuator 505 includes a translation stage 1104, an L-bracket 1106, a rail 1108, and a motor 1109. The translation stage 1104 is coupled to the objective 140 through L-bracket 1106, and movably coupled to the housing 902 through rail 1108. This combination of elements allows movement in the direction indicated by arrow 1110 that is parallel to the light path 122. The aperture 1112 is provided in the housing 902 for the light path 122 to the objective lens 142. A similar translation stage can be implemented for any of the objective modules described herein. For example, the translation stage 1104 can be included with the objective modules 108a, 108b, 108c (FIGS. 3A-3C).

Figure 12A:
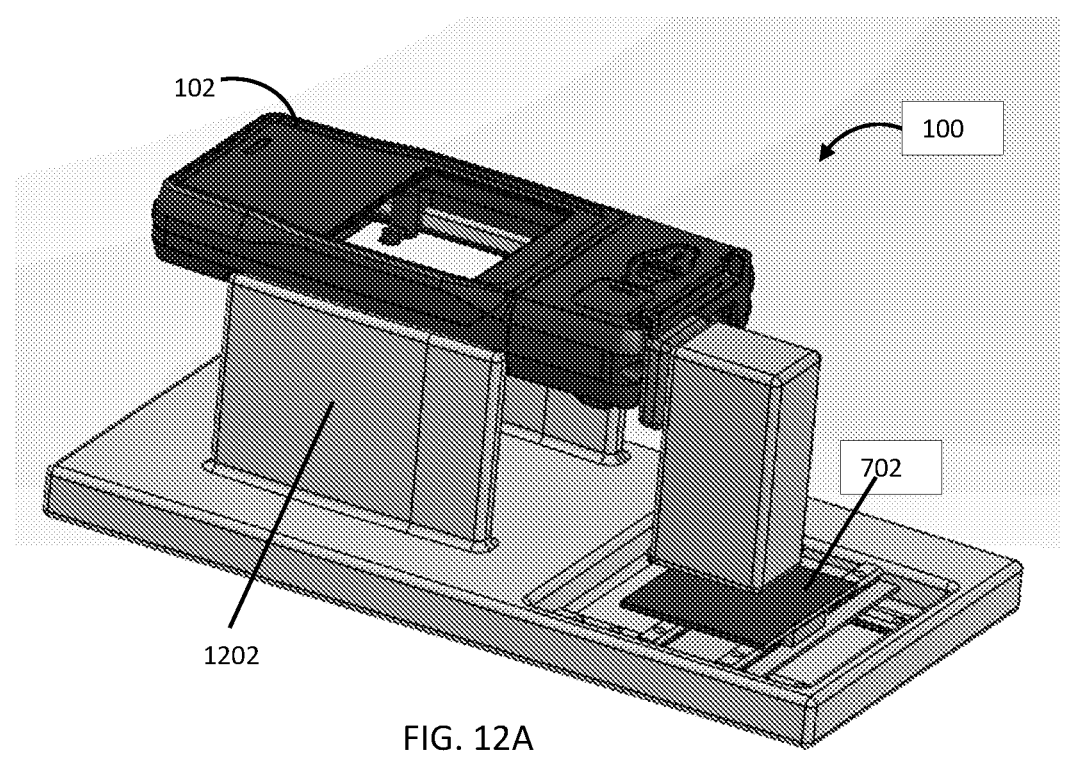
FIGS. 12A and 12B show implementations related to those shown in FIGS. 9A-9D and include a stage.
Figure 12B:
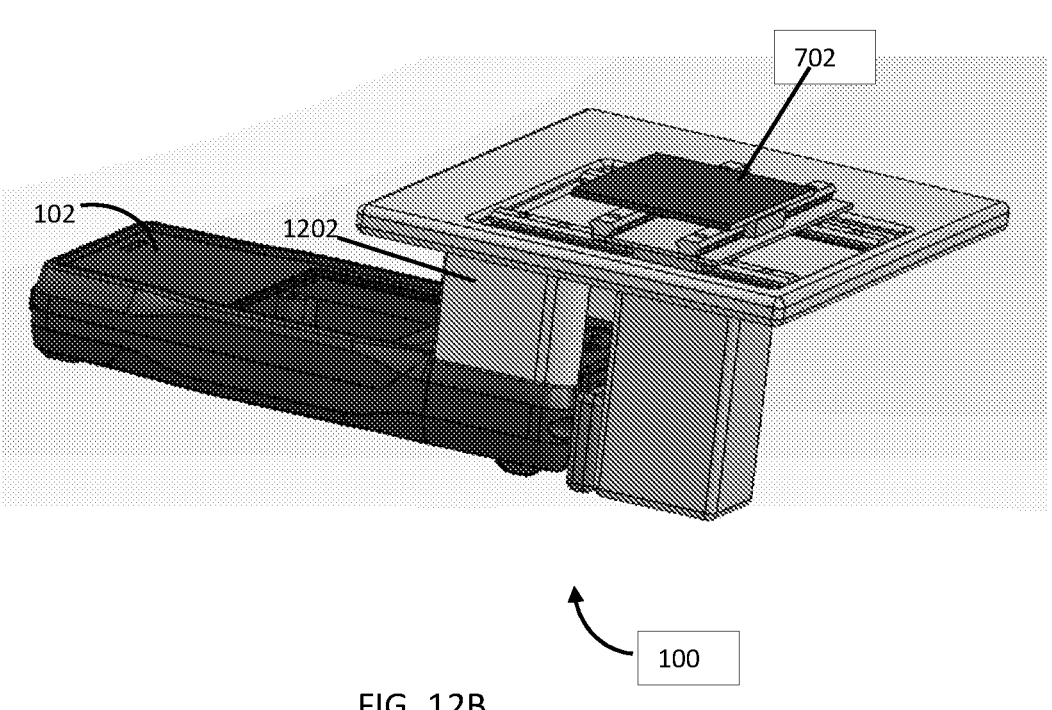

FIGS. 12A and 12B show implementations related to those shown in FIGS. 9A-9D and include the stage 702. The stage 702 is coupled to the Raman Spectrometer 102 through coupling posts 1202. In FIG. 12A the modular accessory 100 is oriented in the down mode ($\beta^3$=180 deg), a microscope orientation. In FIG. 12B the modular accessory is oriented in the up mode ($\beta^1$=0 deg), an inverted microscope orientation.

Figure 13:
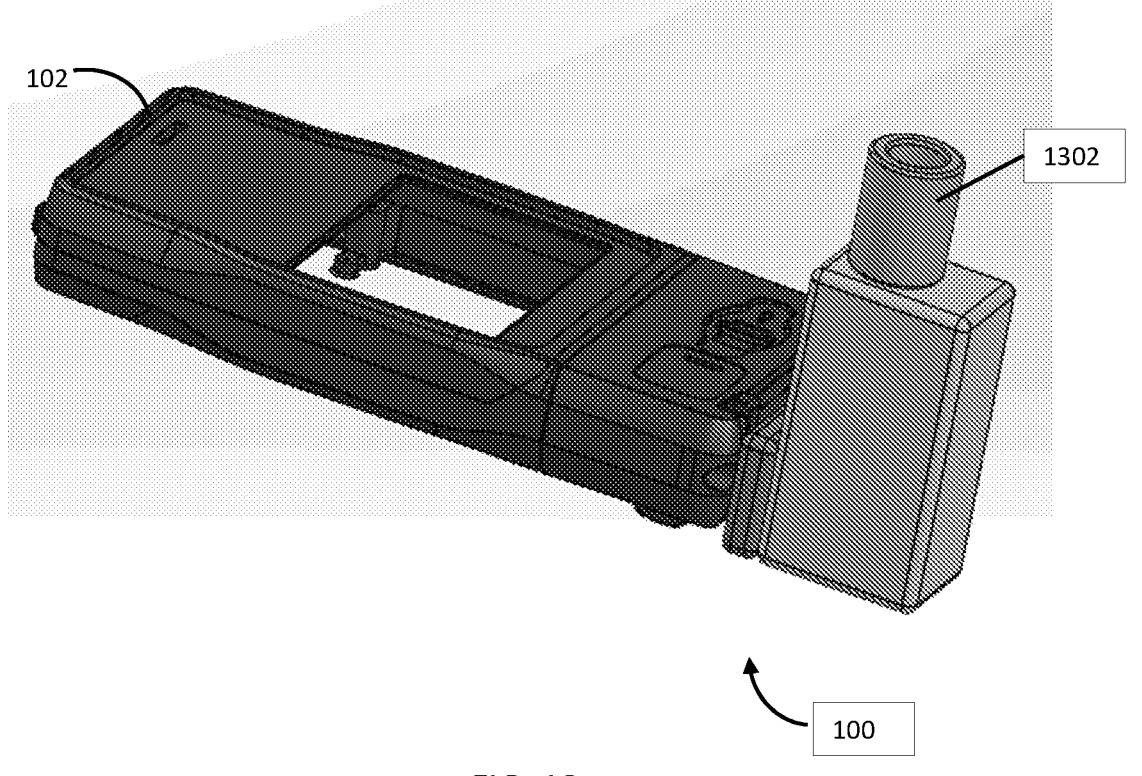
FIG. 13 shows and implementation according to FIGS. 9A-9D of the modular accessory coupled to Raman spectrometer and includes a sample holder.

FIG. 13 shows and implementation according to FIGS. 9A-9D of the modular accessory 100 coupled to the Raman spectrometer 102 and includes a sample holder 1302. The sample holder 1302 is shown as a cylinder but it can be configured as the sample holder 602 (FIG. 6A) as well. The sample holders 1302 and 602 are equivalent in function and use. Accordingly, the modular accessory 100 is oriented in the up mode ($\beta^1$=0 deg).

In addition to using the modular accessory 100 shown by FIGS. 9A-9D with the stage 702 as shown in FIGS. 12A-12B, and the sample holder 1302 shown in FIG. 13, the modular accessory 100 can be used as a point and shoot device in any of the orientations of swivel angle β. In some implementations, the second side mode ($\beta^2$=90 deg, FIG. 9D) is a storage mode. The storage mode provides a compact and aligned unit of the Raman spectrometer 102 and the modular accessory 100.

Referring back to FIG. 1A, in some implementations the objective module 108 is configured to rotate about an axis that is parallel to the tertiary X axis of the Raman spectrometer 102. The rotation provides two or more tilt angle positions α, each tilt angle position α configured to orient the light path 122 perpendicular to a different sample surface.

Figure 14A:
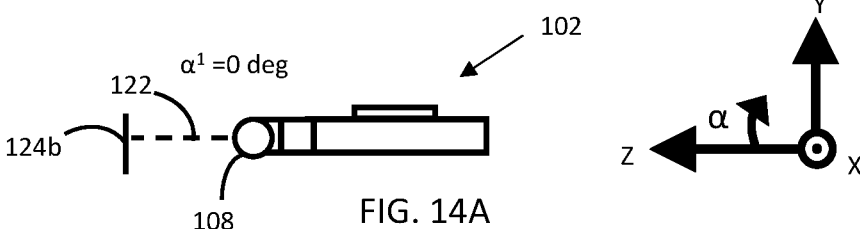
FIGS. 14A-14C show some different tilt angle positions that can be achieved with the modular accessory, according to some implementations.
Figure 14B:
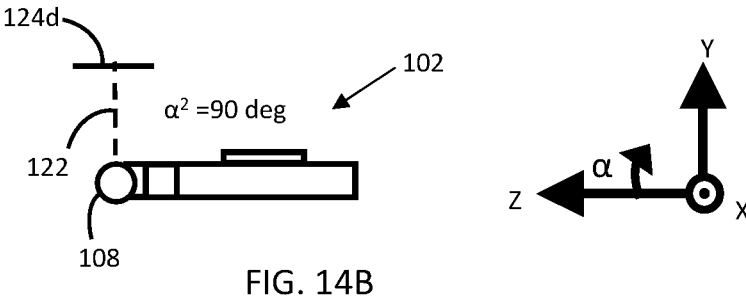
Figure 14C:
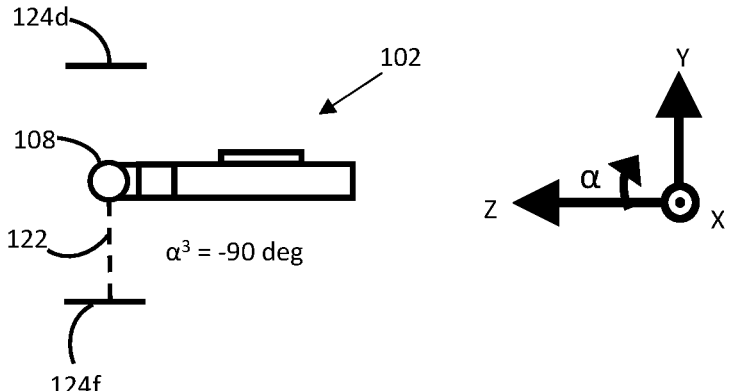

FIGS. 14A-14C show some different tilt angle positions that, without limitation, can be achieved. In some implementations, as shown in FIG. 14A, a first tilt angle ($\alpha^1$=0 deg) is configured to orient the light path 122 perpendicular to the eighth sample surface 124b, and the light path 122 is parallel to the optical axis Z of the Raman spectrometer 102. In some implementations, as show in FIG. 14B, a second tilt angle ($\alpha^2$=90 deg) is configured to orient the light path 122 perpendicular to the ninth sample surface 124d, and the light path 122 is parallel to the secondary axis Y of the Raman spectrometer 102. In some implementations, as show in FIG. 14C, a third tilt angle ($\alpha^1$=270 deg or −90 deg) is configured to orient the light path 122 perpendicular to the tenth sample surface 124f, the light path 122 is parallel to the secondary axis Y of the Raman spectrometer, and the tenth sample surface 124f faces the ninth sample surface 124d. Other implementations include any tilt angle α between about −120 deg and about +120 deg for orientation of the light path 122. In some implementations the orientation of the light path 122 can be at any of three or more tilt angles α between −90 deg and +90 deg.

FIGS. 15A-15C are 3D views of the modular accessory 100 mounted to the Raman spectrometer 102, according to implementations with different accessible tilt angles α. In this implementation, the objective module 108 is configured to allow rotation relative to the base module 106 and to access different tilt angles of α. The attachment module 104 and the base module 106 remain in a fixed position. FIG. 15A shows a forward mode ($\alpha^1$=0 deg). FIG. 15B shows an up mode ($\alpha^2$=90 deg). FIG. 15C shows a down mode ($\alpha^3$=−90 deg). FIGS. 15A and 15B show the placement of the objective lens 142 through the aperture 1112 in a wall of the objective module 108. FIG. 15A shows the light path 122 perpendicular to the eighth sample surface 124b. FIG. 15B shows the light path 122 perpendicular to the ninth sample surface 124d. FIG. 15C shows the light path 122 perpendicular to the tenth sample surface 124f.

Apertures 1502 are also indicated in a drum portion 1504 of the objective module 108. These are formed on the outer wall of the drum portion 1504 around a circumference 1508, as indicated in FIG. 15C. As described below, the apertures 1502 provide a path for the sample beam 130 through the objective module 108 and to the base module 106. In some implementations, the apertures 1502 are formed as a continuous slot or opening around the circumference 1508. A handle 1510 is included for user positioning of the objective module 108 to different tilt angles α. Positioning features other than the handle 1510 can be implemented, such as a knob.

FIGS. 16A and 16B are cross-cut side views of the modular accessory 100, according to the implementation shown by FIGS. 15A-15C. FIG. 16C shows a gear system for rotation of the drum portion 1504 and FIG. 16D shows some internal components. FIG. 16A shows the down mode ($\alpha^3$=−90 deg). FIG. 16B shows the forward mode ($\alpha^1$=0 deg). The visible light imager 126 and first beam splitter 132 are shown in the base module 106 and function as previously described. The drum portion 1504 includes a sixth mirror 1602. Rotation of the drum portion 1504, for example using the handle 1510 orients the light path 122 at the different tilt angles α, where the sixth mirror 1602 directs the sample light beam 130 through the objective 140 to the first beam splitter 132. Although not shown, an objective actuator 505 can also be implemented as previously described (FIG. 11).

The sixth mirror 1602 is configured to rotate through half the angular distance of the objective 140. For example, an orientation angle $\gamma^1$=−45 deg of the sixth mirror 1602 shown in FIG. 16A moves to an orientation angle $\gamma^2$=0 deg shown in FIG. 16B; while an orientation angle $\theta^1$=−90 deg of the objective module shown in FIG. 16A moves to an orientation angle $\theta^2$=0 deg shown in FIG. 16B. This movement is achieved by a gear assembly such as a planetary gear system 1604 shown in FIG. 16C. A ring gear 1606 is coupled to the drum portion 1504 and a sun gear 1608 is coupled to the handle 1510. Angled wall 1612 is coupled to the base module 106 where the aperture 1614 formed in the angled wall 1612 is aligned to allow the sample light beam 130 to pass from the drum portion 1504 to the base module 106 as shown in FIGS. 16A and 16B. A ratchet mechanism (not show) can also be implemented so that specific angles are held. For example, a ratchet mechanism as described with reference to FIG. 10 can be implemented. Optionally, a stepper motor that is controlled by the user interface 114 through the CPU processor of the Raman spectrometer 102 is coupled to the sun gear.

FIG. 16D shows the components described in FIGS. 16A-16C. A translation stage 1616 is implemented to move the objective 140 in the Y' direction and out of the path of the sample light beam 130. The translation stage 1616 is coupled to the objective 140 through L-bracket 1618. The translation stage 1616 is only needed if a center rotation axis 1618 of sixth mirror 1602 is positioned in the path of light beam 130. Accordingly, in some implementations the center rotation axis 1618 of the sixth mirror 1602 is not positioned in the path of the sample light beam 130 and the translation stage 1616 is not required.

Figure 17A:
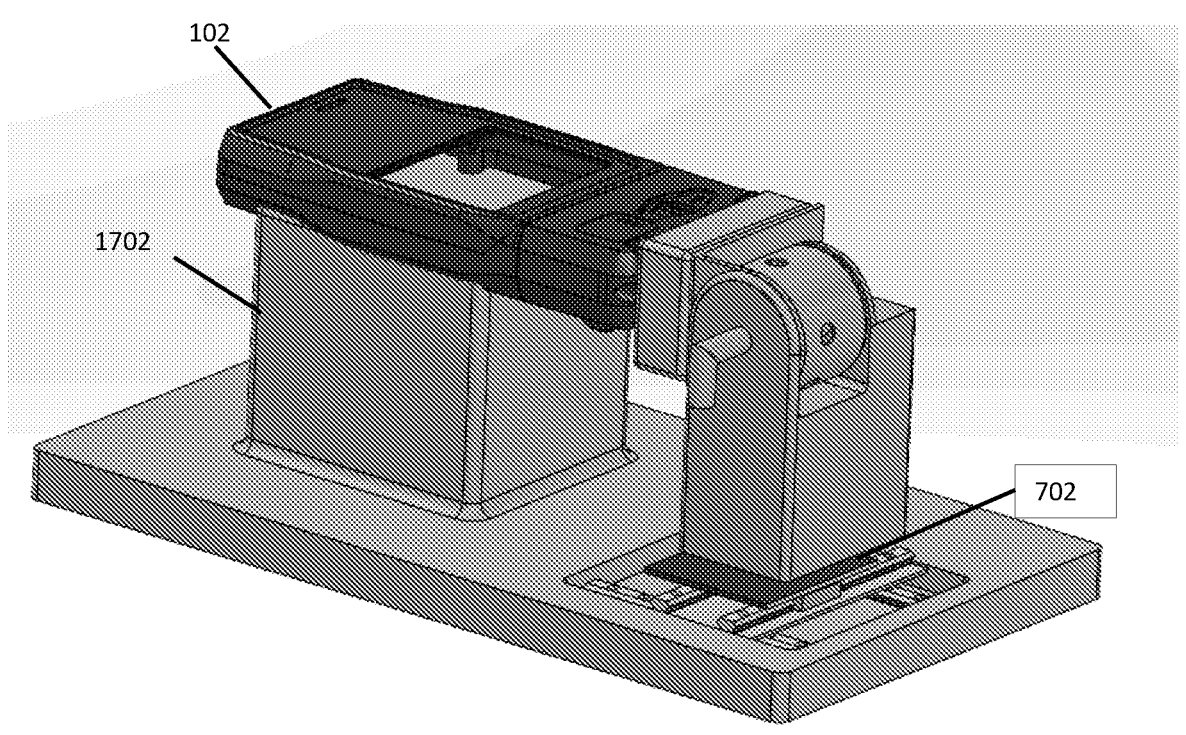
FIGS. 17A and 17B show implementations according to those shown in FIGS. 15A-15C and include a stage.
Figure 17B:
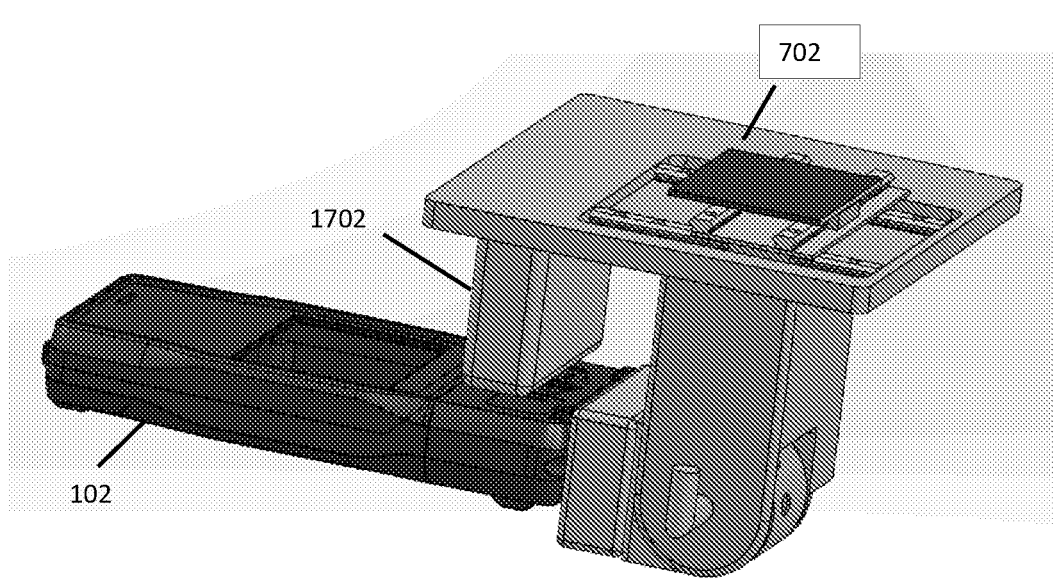

FIGS. 17A and 17B show implementations according to those shown in FIGS. 15A-15C and include the stage 702, where the stage 702 is similar to the implementations shown previously. The stage 702 is coupled to the Raman spectrometer 102 through a coupling post 1702. In FIG. 17A the modular accessory 100 is orient in the down mode ($\alpha^3=-90$ deg), a microscope orientation. In FIG. 17B the modular accessory is oriented in the up mode ($\alpha^2=90$ deg), an inverted microscope orientation.

Figures 18, 19:
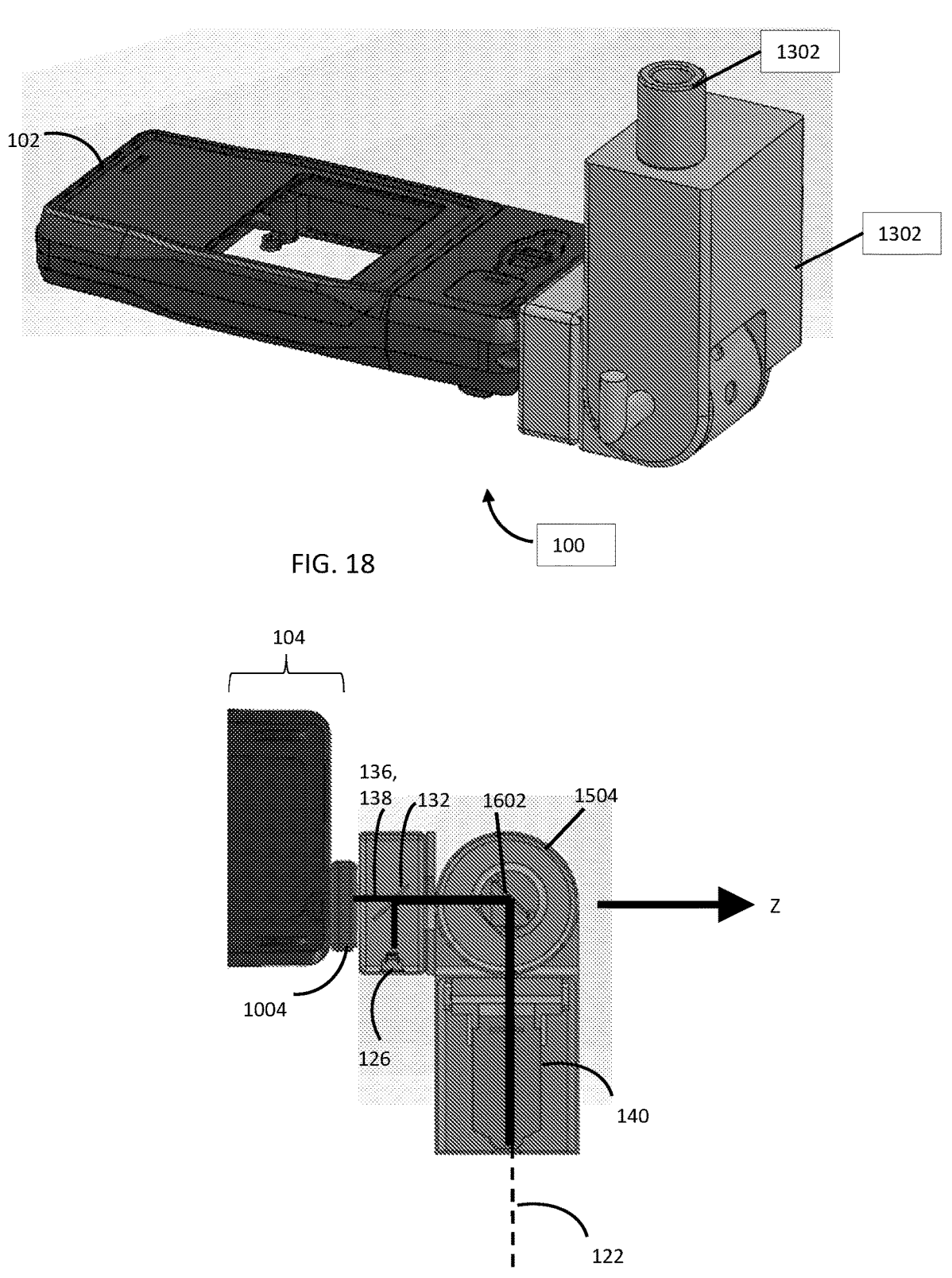
FIG. 18 shows an implementation according to FIGS. 15A-15C of modular accessory coupled to Raman spectrometer and includes the sample holder.
FIG. 19 shows an implementation of the modular accessory allowing tilt and swivel angles, according to some implementations.

FIG. 18 shows an implementation according to FIGS. 15A-15C of the modular accessory 100 coupled to the Raman spectrometer 102 and includes the sample holder 1302. The sample holder 1302 can also be configured as the sample holder 602 (FIG. 6A). The modular accessory 100 is oriented in the up mode ($\alpha^2=90$ deg) to void spilling out contents in the sample holder 1302.

In addition to using the modular accessory 100 shown by FIGS. 17A-17D with the stage 702, and with the sample holder 1302 shown by FIG. 18, the modular accessory 100 can be used as a point and shoot device in any of the orientations of tilt angle $\alpha$.

According to some implementations, the second portion 1004 (FIG. 10) that allows access to the swivel angle positions $\beta$, is included with the modular accessory described with reference to FIGS. 15A-15C. For example, the second portion 1004 can be included with the attachment module 104 and positioned as indicated by FIG. 19. The components such as the first beam splitter 132, the visible light imager 126, the sixth mirror 1602, the objective 140 and the drum portion 1504 provide the Raman light beam 136,138, from or to the second portion 1004. The second portion 1004 operates as previously described to direct the sample light path 122 at any swivel angle $\beta$. Any angle defined by the combination of tilt angle $\alpha$ and swivel angle $\beta$ are accessible by this implementation.

In some implementations, the modular accessory 100 as described herein can further include a confocal assembly. In some implementations, the modular accessory 100 as described herein can further include a visible light source for illuminating the sample. These further implementations are described with reference to FIGS. 20A-20D.

Figure 20A:
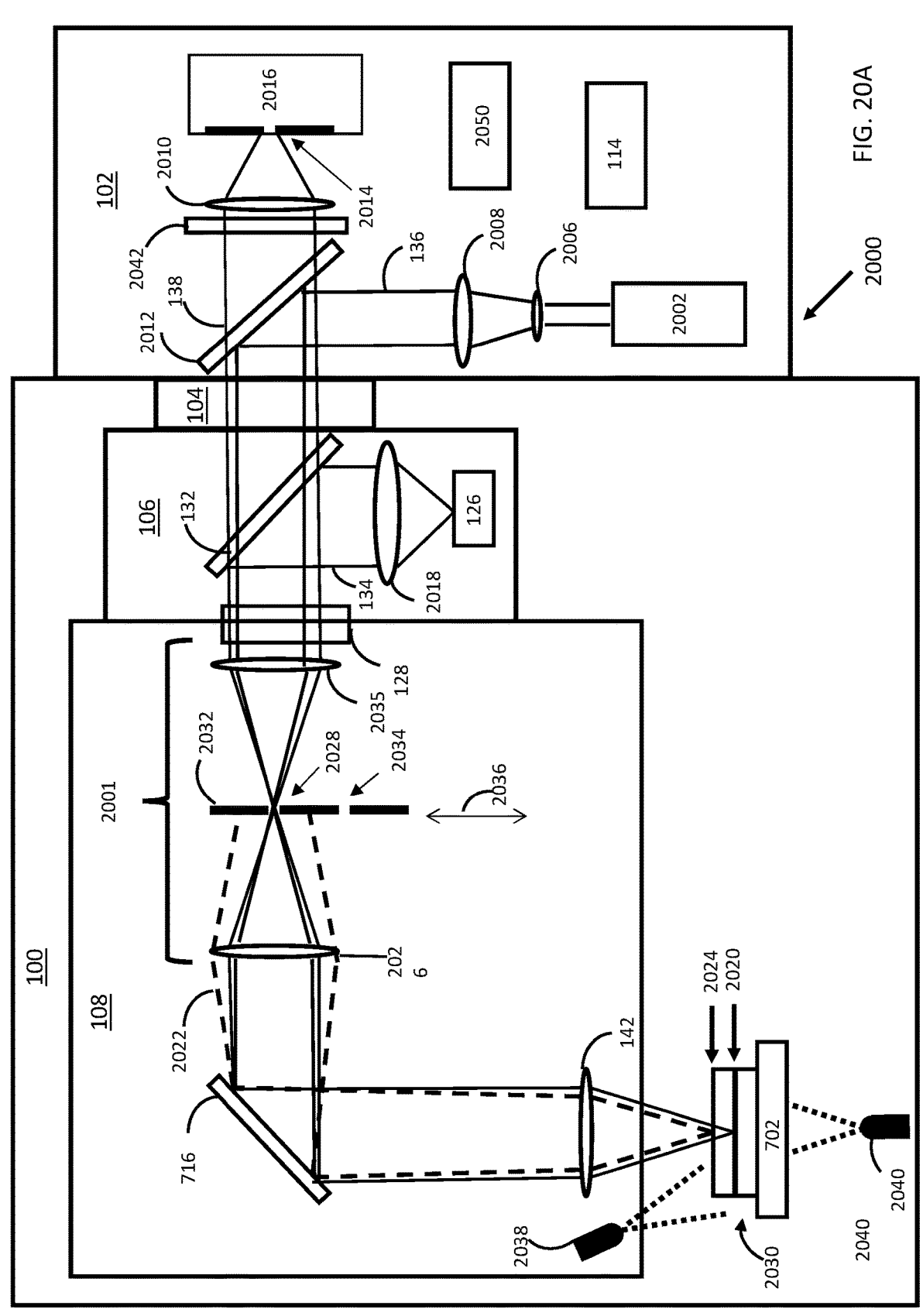

FIG. 20A is a schematic diagram of a portable Raman system 2000, according to some implementation. The system 2000 includes the modular accessory 100 coupled to the Raman spectrometer 102. The Raman spectrometer includes components such as an excitation laser 2002 providing the Raman excitation beam 136. Expanding optics 2006, collimating optics 2008 and focusing optics 2010 can also be included. A second beam splitter 2012, such as a dichroic mirror, sends the Raman excitation beam 136 out of the Raman spectrometer 102. The second beam splitter 2012 also directs the Raman emission beam 138 to an entrance slit 2014 of a spectrograph 2016. The Raman excitation beam 136 and the Raman emission beam 138 pass through the attachment module 104 which is coupled to the Raman spectrometer 102 and coupled to the base module 106. A CPU 2050 is connected to and controls components in the system.

The base module 106 includes the first beam splitter 132 and the visible light imager 126. Focusing optics such as 2018 can be included as part of the visible light imager 126 or included as an additional component. The first beam splitter 132 is transparent to at least a portion of the Raman excitation beam 136 and the Raman emission beam 138. The first beam splitter 132 also reflects a portion of visible light and provides the visible light beam 134 directed towards the visible light imager 126.

The objective module 108 includes the objective lens 142. The objective lens 142 focuses the Raman excitation beam 136 on a focal plane 2020 of sample 2030 and focuses the Raman excitation beam 136 into the Raman emission beam 138. In addition, some non-focal plane light 2022 (denoted with a dashed line) from non-focal planes, such as non-focal plane 2024, is sent back with the Raman emission beam 138. A confocal assembly 2001, which is positioned in the objective module 108, includes a confocal lens 2026, a screen 2032 having a first pinhole 2028, and a collimating lens 2035. The confocal lens 2026, matching the objective lens 142, focuses the Raman emission beam 138 to the first pinhole 2028. The screen 2032 blocks the non-focal plane light 2022. Raman emission beam 138 passing through the first pinhole 2028 is collimated by collimating lens 2035 and sent back to the Raman Spectrometer 102. In this implementation, the confocal assembly 2001 provides confocal light to the visible light imager 126 as well as to the Raman spectrometer 102.

In some implementations, the screen 2032 can be moved, as indicated by double headed arrow 2036, out of the Raman emission beam 138 to allow all the light, including the non-focal plane light 2022 back to the Raman spectrometer 102. The screen can be moved by a manual actuator or by an electronically controlled actuator (e.g., controlled through access of the user interface 114). In some implementations, the screen 2032 includes a second pinhole 2034. By moving the screen, the second pinhole 2034 can be positioned at the focus of the confocal lens 2026. In some implementations, a second pinhole 2034 has a dimeter larger than the first pinhole 2028. This difference in size allows a different amount of light through the first pinhole 2028 as compared to the second pinhole 2034. In some implementations the screen is movable to a first position where the first pinhole 2028 is positioned at the focal point of the confocal lens 2026, and the screen 2032 is movable to a second position wherein the second pinhole 2034 is positioned at the focal point of the confocal lens 2026.

In some implementations, the stage 702 is included for holding the sample 2030. In some implementations, one or more visible light sources are also included in the modular accessory 100. For example, a first light source 2038 illuminates the sample 2030 from above. As another example, a second light source 2040 illuminates the sample 2030 from below, where at least a portion of the stage is transparent to some of the illuminating light. As previously described, various mirrors can be used in optic relays to redirect light. In the shown implementation, the fifth mirror 716 is included to direct the light to and from the stage 702. A Rayleigh rejection filter 2042 is also indicated.

Figure 20B:
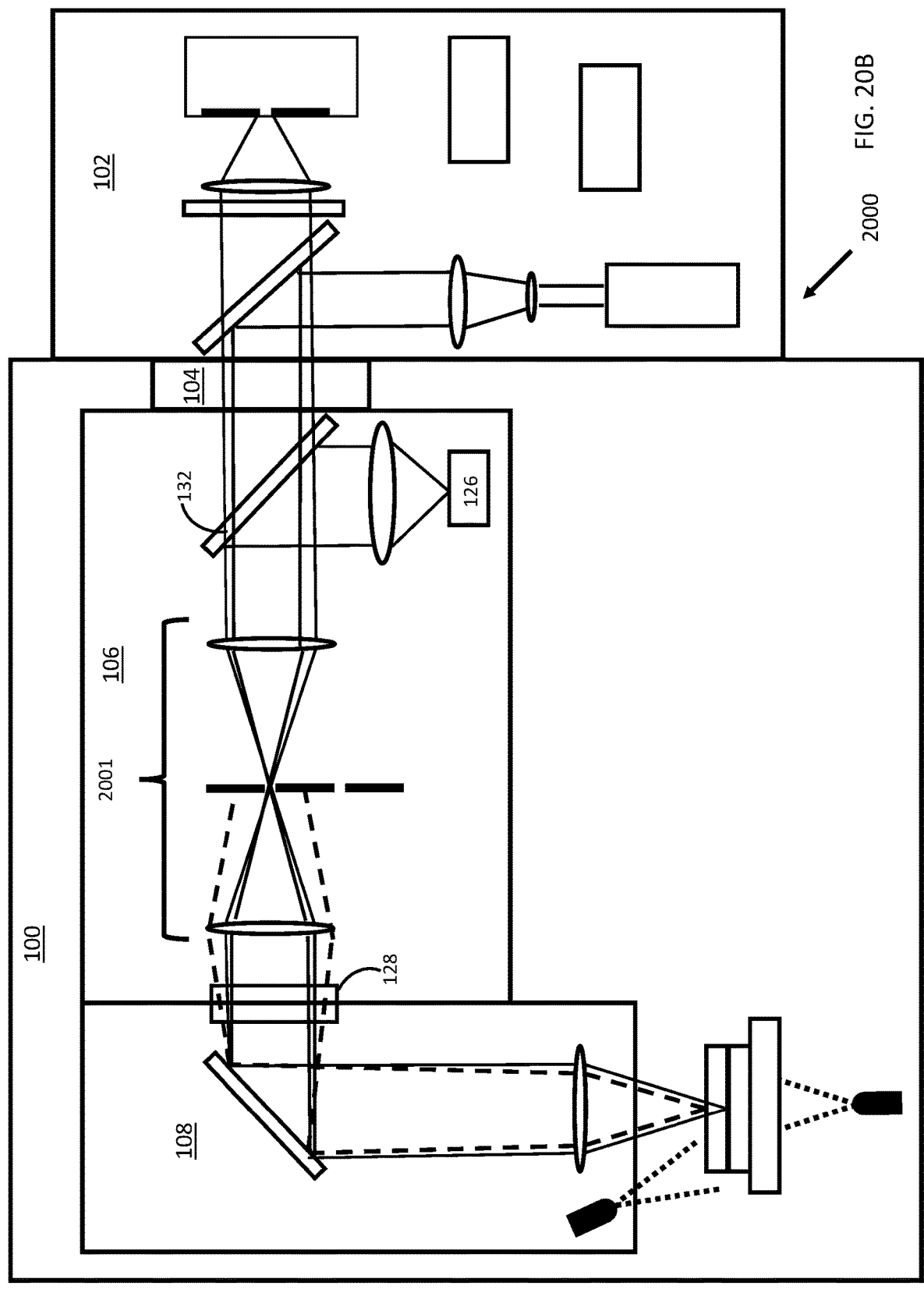

FIG. 20B is another implementation of the portable Raman system 2000. In this implementation, the confocal assembly 2001 is positioned in the base module 106. The confocal assembly 2001 is positioned in the sample light beam 130 (FIG. 1C) between the input 128 and the first beam splitter 132. The confocal assembly provides confocal light to the visible light imager 126 as well as to the Raman spectrometer 102.

FIG. 20C shows yet another implementation of the portable Raman system 2000. In this implementation, the confocal assembly 2001 is positioned in the base module 106. The confocal assembly 2001 is positioned in the Raman light beam comprised of the Raman excitation beam 136 and the Raman emission beam 138, between the first beam splitter 132 and the attachment module 104. In this implementation, only the Raman emission light is confocal, where the non-focal plane light 2022 is sent to the visible light imager 126.

In some implementations, the confocal assembly 2001 can be positioned in the attachment module 104. In some implementations, the confocal assembly 2001 can be positioned in the Raman spectrometer 102. In the implementations where the confocal assembly 2001 is positioned in the Raman spectrometer 102, the screen 2032 can be placed in front of the entrance slit 2014 of the spectrograph 2016 (FIG. 20A), or the screen 2032 can include pin holes and the entrance slit 2014 where, for confocal use, the pinholes can be brought into the focus of the confocal lens 2026, while in a non-confocal use, the entrance slit 2014 can be brought into focus of the confocal lens 2026.

Figure 20D:
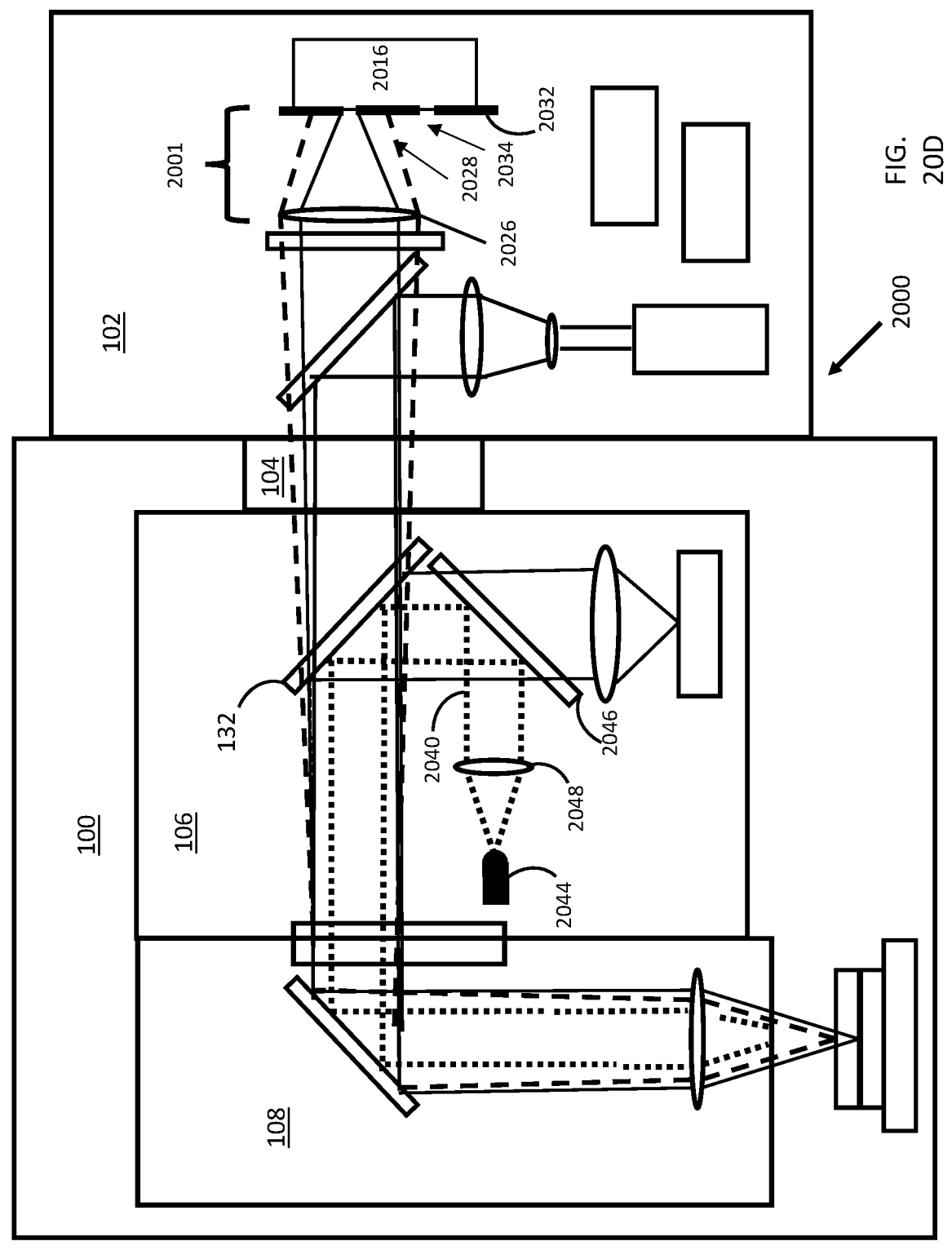

FIG. 20D is a schematic diagram of the portable Raman system 2000, according to some implementations. The modular accessory 100 includes a visible light source 2044 for illuminating the sample. The light source 2044 provides an illumination beam, shown as a dotted line, through the base module 106 and the objective module 108. In some implementations, the light source 2044 is introduced in the objective module 108, so that the light source only passes through the objective module 108. A third beam splitter 2046, such as a partially (e.g., 50%) light reflective mirror, is included. Collimating optics 2048 can be included. FIG. 20D implements the confocal assembly 2001' integrated in the Raman spectrometer 102. The confocal assembly 2001' includes the confocal lens 2026 and screen 2032, but the collimating lens 2035 is not used. The entrance slit 2014 to the spectrograph 2016 is replaced by the screen 2032.

A person of skill in the art can select from one or more components to include in the systems depicted by FIGS. 20A-20D. For example, the system can exclude the confocal assembly 2001, or the system can exclude the visual imager 126. Similarly, the systems can include any of the components described herein to orient the Raman beam 136, 138 at any angle relative to the optical axis Z of the Raman spectrometer 102. The following numbered paragraphs 1-24 provide various examples of the embodiments disclosed herein.

Paragraph 1. A modular accessory (100) for orienting a light path at different angles to an optical axis of a spectrometer, the modular accessory (100) comprising: an attachment module (104) configured to couple to a Raman spectrometer (102) oriented along an optical axis (Z) of the Raman spectrometer (102); a base module (106) including a visible light imager (126) and configured to couple to the Raman spectrometer (102) through the attachment module (104), the base module (106) including an input (128) for a sample light beam (130) and a first beam splitter (132) providing bifurcation of the sample light beam (130), the bifurcation providing a visible light beam (134) directed to the visible light imager (126) and a Raman light beam directed along the optical axis (Z) of the Raman spectrometer, the Raman light beam including a Raman excitation beam (136) from the Raman spectrometer (102) and a Raman emission beam (138) to the Raman spectrometer (102); and an objective module (108) coupled to the base module (106) and including an objective (140) configured to provide an optical path for the sample light beam (130) travelling from a sample (144) along a light path (122) to an objective lens (142) of the objective (140), through the objective (140), and to the input (128) for the sample light beam (130) of the base module (106).

Paragraph 2. The modular accessory according to paragraph 1, wherein the Raman Spectrometer (102) includes a user interface (114) oriented substantially for viewing along a secondary axis (Y) of the Raman spectrometer, and oriented substantially parallel to a plane defined by the optical axis (Z) and a tertiary axis (X) of the Raman spectrometer Paragraph 3. The modular accessory according to paragraph 1 or paragraph 2, wherein the objective module (108) is selected from one or more modules each configured to orient the light path (122) perpendicular to a different sample surface.

Paragraph 4. The modular accessor according to paragraph 3 wherein: a first objective module (108*a*) is configured to orient the light path (122) perpendicular to a first sample surface (124*a*), wherein the light path is parallel to the optical axis (Z) of the Raman spectrometer (102); a second objective module (108*b*) is configured to orient the light path (122) perpendicular to a second sample surface (124*c*), wherein the light path (122) is parallel to a secondary axis (Y) of the Raman spectrometer (102); and a third objective module (108*c*) is configured to orient the light path (122) perpendicular to a third sample surface (124*e*), wherein the light path is parallel to the secondary axis (Y) of the Raman spectrometer (102), and wherein the third sample surface (124*e*) faces the second sample surface (124*c*).

Paragraph 5. The modular accessory according to any of paragraphs 1-4, wherein the attachment module (104) is configured to provide relative rotation between the objective module (108) and the Raman spectrometer (102) about the optical axis (Z) of the Raman spectrometer (102), and wherein the relative rotation provides two or more swivel angle ($\beta$) positions, each swivel angle ($\beta$) position configured to orient the light path (122) perpendicular to a different sample surface.

Paragraph 6. The modular accessory according to paragraph 5, wherein: first swivel angle ($\beta^1$) position orients the light path (122) parallel to a secondary axis (Y) of the Raman spectrometer (102) and perpendicular to a fourth sample surface (124*h*); a second swivel angle position ($\beta^2$) orients the light path (122) parallel to a tertiary axis (X) of the Raman spectrometer (102) and perpendicular to a fifth sample surface (124*i*); a third swivel angle position ($\beta^3$) orients the light path (122) parallel to the secondary axis (Y) of the Raman spectrometer (102) and perpendicular to a sixth sample surface (124*j*), wherein the sixth sample surface (124*j*) faces the fourth sample surface (124*h*); and a fourth swivel angle position ($\beta^4$) orients the light path (122) parallel to the tertiary axis (X) of the Raman spectrometer (102) and perpendicular to a seventh sample surface (124*k*), wherein the seventh sample surface (124*k*) faces the fifth sample surface (124*i*).

Paragraph 7. The modular accessory according to any of paragraphs 1-6, wherein the objective module (108) is configured to rotate and provide two or more tilt angle positions ($\alpha$), each tilt angle position ($\alpha$) configured to orient the light path (122) perpendicular to a different sample surface.

Paragraph 8. The modular accessory according to paragraph 7, wherein; a first tilt angle ($\alpha^1$) is configured to orient the light path (122) perpendicular to an eighth sample surface (124*b*), wherein the light path (122) is parallel to the optical axis (Z) of the Raman spectrometer (102); a second tilt angle ($\alpha^2$) is configured to orient the light path (122) perpendicular to a ninth sample surface (124*d*), wherein the light path (122) is parallel to a secondary axis (Y) of the Raman spectrometer (102); and a third tilt angle ($\alpha^3$) is configured to orient the light path (122) perpendicular to a tenth sample surface (124*f*), wherein the light path (122) is parallel to the secondary axis (Y) of the Raman spectrometer (102), and wherein the tenth sample surface (124*f*) faces the ninth sample surface (124*d*).

Paragraph 9. The modular accessory according to any of paragraphs 1-8, wherein the objective module (108) includes a sample holder (602, 1302) including a transparent portion (608), wherein the transparent portion (608) is aligned with the light path 122.

Paragraph 10. The modular accessory according to any of paragraphs 1-9 further including a stage (702) coupled through the Raman spectrometer (102) to the objective module (108) and configured to provide a substantially flat platform for sample placement.

Paragraph 11. The modular accessory according to paragraph 10, wherein the modular accessory (100) includes actuators (505) for relative movement between the stage (702) and the objective module (108).

Paragraph 12. The modular accessory according to any of paragraphs 1-11 further comprising an optics relay orienting one or more of the sample light beam (130), the Raman excitation beam (136), and Raman emission beam (138).

Paragraph 13. The modular accessory according to any of paragraphs 1-12, wherein the visible light imager (126) is a camera.

Paragraph 14. The modular accessory according to any of paragraphs 1-13, wherein the objective (140) provides a magnification of up to at least 10 times.

Paragraph 15. The modular accessory according to any of paragraphs 1-14, wherein the base module (106) and the objective module (108) are reversibly coupled.

Paragraph 16. The modular accessory according to any of paragraphs 1-15, wherein the base module (106) and the objective module (108) are non-reversibly coupled.

Paragraph 17. The modular accessory according to any of paragraphs 1-16 further including a confocal assembly (2001).

Paragraph 18. The modular accessory according to paragraph 17, wherein the confocal assembly is positioned in one of: a) the objective module (108); b) the base module (108) and in the sample light beam (130); or c) the base module and in the Raman light beam (136, 138).

Paragraph 19. The modular accessory according to paragraph 17, wherein the confocal assembly (2001) includes a confocal lens (2026) and a screen (2032) having a first pinhole (2028), wherein the screen is moveable (2036) to a position wherein the first pinhole (2028) is positioned at a focal point of the confocal lens (2026).

Paragraph 20. The modular accessory according to paragraph 19, wherein the screen includes a second pinhole (2034) having a dimeter larger than the first pinhole (2028), and the screen is movable to a second position wherein the second pinhole is positioned at the focal point of the confocal lens (2026).

Paragraph 21. The modular accessory according to any of paragraphs 1-20 further comprising a visible light source (2038, 2040, 2044) for illuminating the sample.

Paragraph 22. The modular accessory according to paragraph 21, wherein the visible light source (2044) provides an illumination beam through the objective module (108).

Paragraph 23. A portable Raman system (2000, 2200) comprising a Raman spectrometer coupled to the attachment module (104) according to any of paragraphs 1-22.

Paragraphs 24. A method of analyzing a sample comprising, placing a sample in the sample light path (122) of the portable Raman system (2000, 2200) according to paragraph 23.

The modular accessory 100 according to the various implementations can be used in a myriad of analysis amenable to Raman interrogation. For example, for analysis of reagents or finished products such as pharmaceuticals, for online or in line analysis of bioreactors, for in-lab analytical analysis, and for in-field analytical analysis. For illustrative purposes, and without limiting the uses, some further examples are discussed below.

EXEMPLIFICATIONS

Handheld Confocal Raman Microscope

Figure 21A:
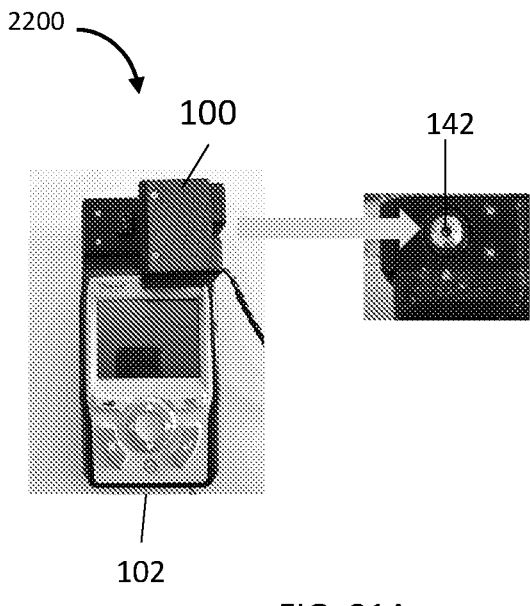
FIGS. 21A and 21B illustrate a Raman system, according to some implementations.
Figure 21B:
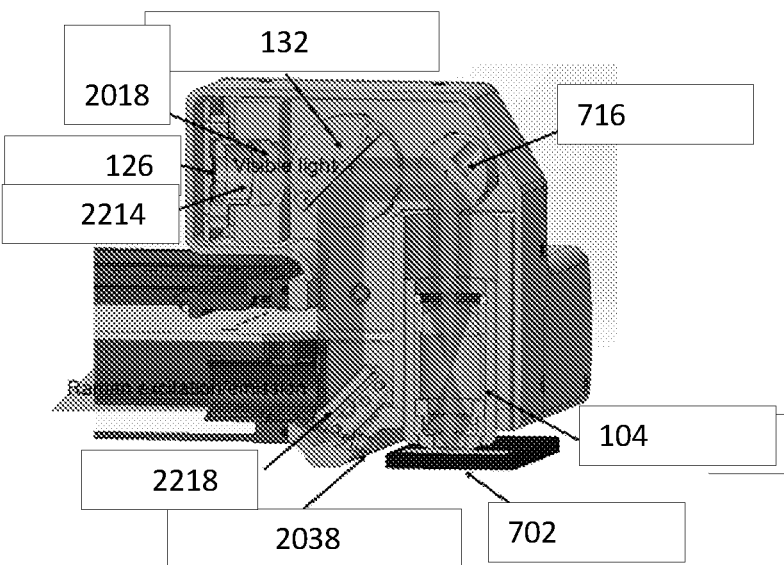

A Raman system 2200 as shown in FIG. 21A was built. Raman system 2200 is a confocal handheld Raman microscope system. The modular accessory 100 was mounted on the handheld Raman spectrometer 102. The bottom of the modular accessory 100 (without the stage) is shown on the right side of FIG. 21A showing the objective lens 142. FIG. 21B is a crosscut view show some details of the design, including the sample stage 702, a microscope objective 140, a fifth mirror 716, a first beam splitter (dichroic mirror with $\lambda_{cut}$=750 nm) 132, a focusing optic 2018 (lens), a visible light imager 126 (chip camera), IR filters 2214, a first light source 2038 (LED), and an LED mirror 2218. A confocal assembly was included as part of the Raman spectrometer 102 as in the implementation depicted by FIG. 20D. That is, the entrance slit to the spectrograph 2016 was replaced with a movable screen 2032. The moveable screen included a slit, a 25 μm pinhole and a 50 μm pinhole which could be independently selected.

Analysis of a Particulate Mixture

An aluminum foil sprinkled with mixtures of citric acid and sucrose was prepared. Some water was used to stick the grains to the aluminum foil.

Figure 22A:
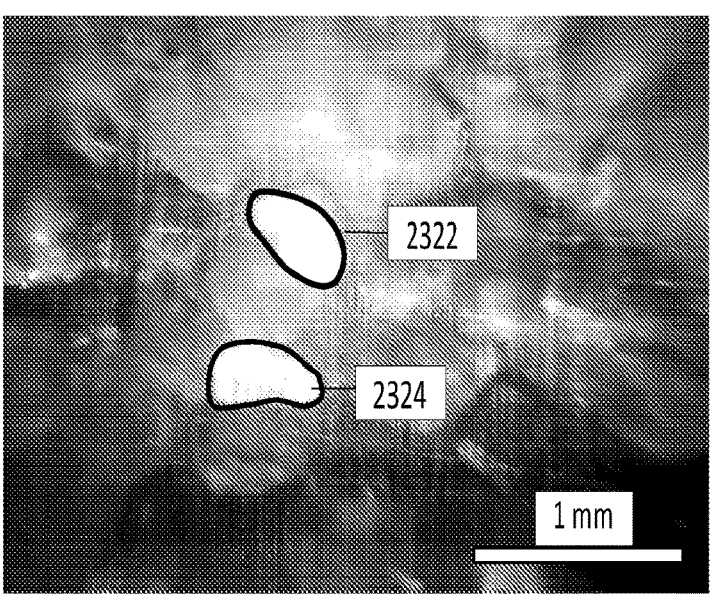
FIGS. 22A and 22B illustrate an analysis using the Raman system according to FIGS. 21A-21B.
Figure 22B:
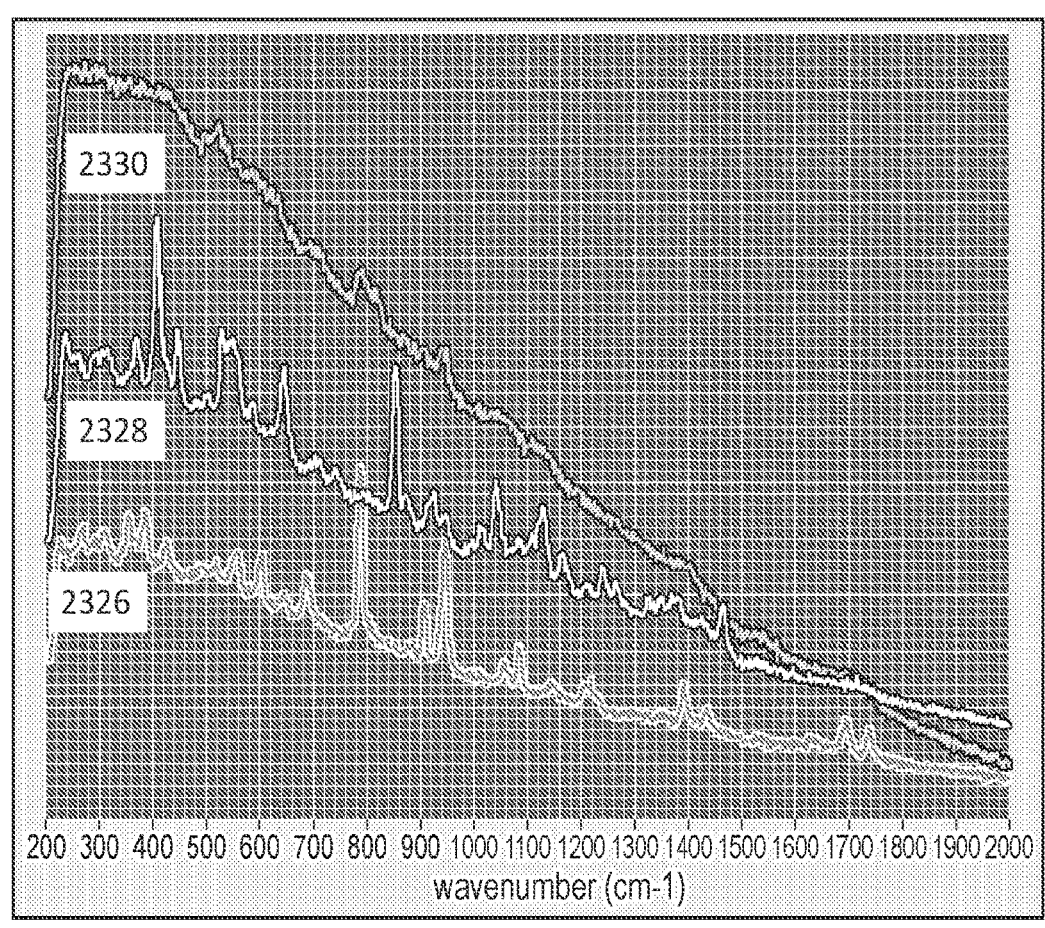

The sample was analyzed using the Raman system 2200. FIG. 22A shows a magnified visual image of the sample collected by the camera 2212. A first crystal 2322 and a second crystal 2324 are outlined to clarify their location. FIG. 22B shows Raman spectra that were collected from the sample using the Raman system 2200. By moving the stage 2202, the first crystal 2322 was brought into the focal spot of the Raman beam and Raman spectra 2326 was collected. The spectra 2326 had characteristics peaks identifying crystal 2322 as a grain of citric acid. The stage was then moved to bring the second crystal 2324 into the focal spot of the Raman beam and Raman spectra 2328 was collected. The spectra 2328 was consistent with peaks characteristic of sucrose. Spectra 2330, which shows few features, was collected between any visible grains of citric acid or sucrose.

Confocal Raman Through a Top Layer

Figure 23A:
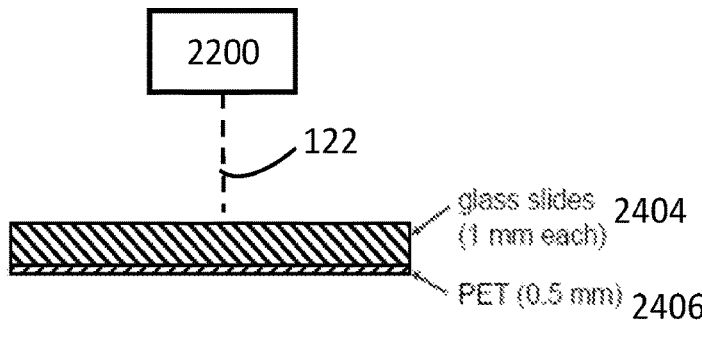
FIGS. 23A-23C illustrate a confocal analysis using the Raman system according to FIGS. 21A-21B.

A sample, depicted in FIG. 23A, that included 0.5 mm of PET 2406 covered by two 1 mm glass slides 2404 was analyzed. Analysis by the Raman system 2200 was from the top as indicated by the light path 122.

Figure 23B:
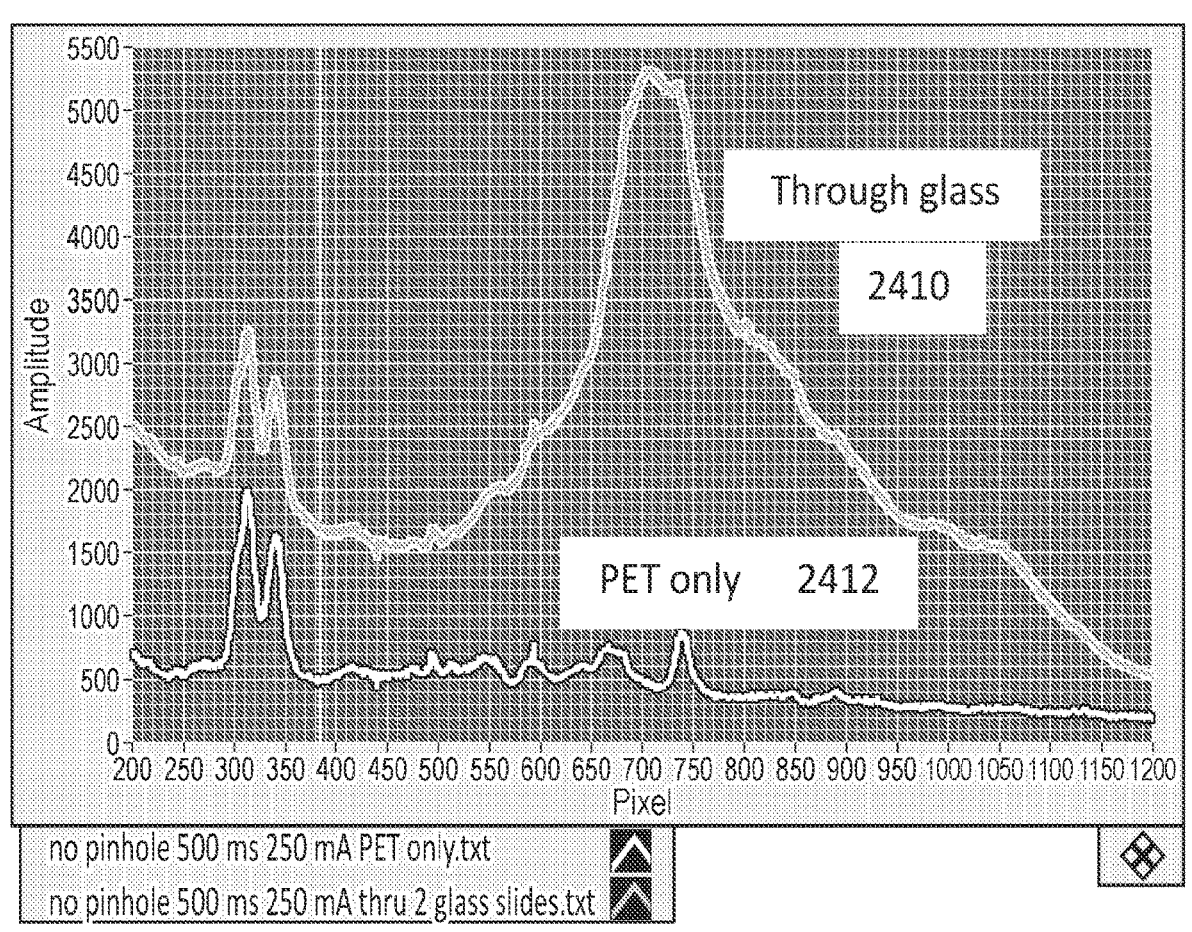
Figure 23C:
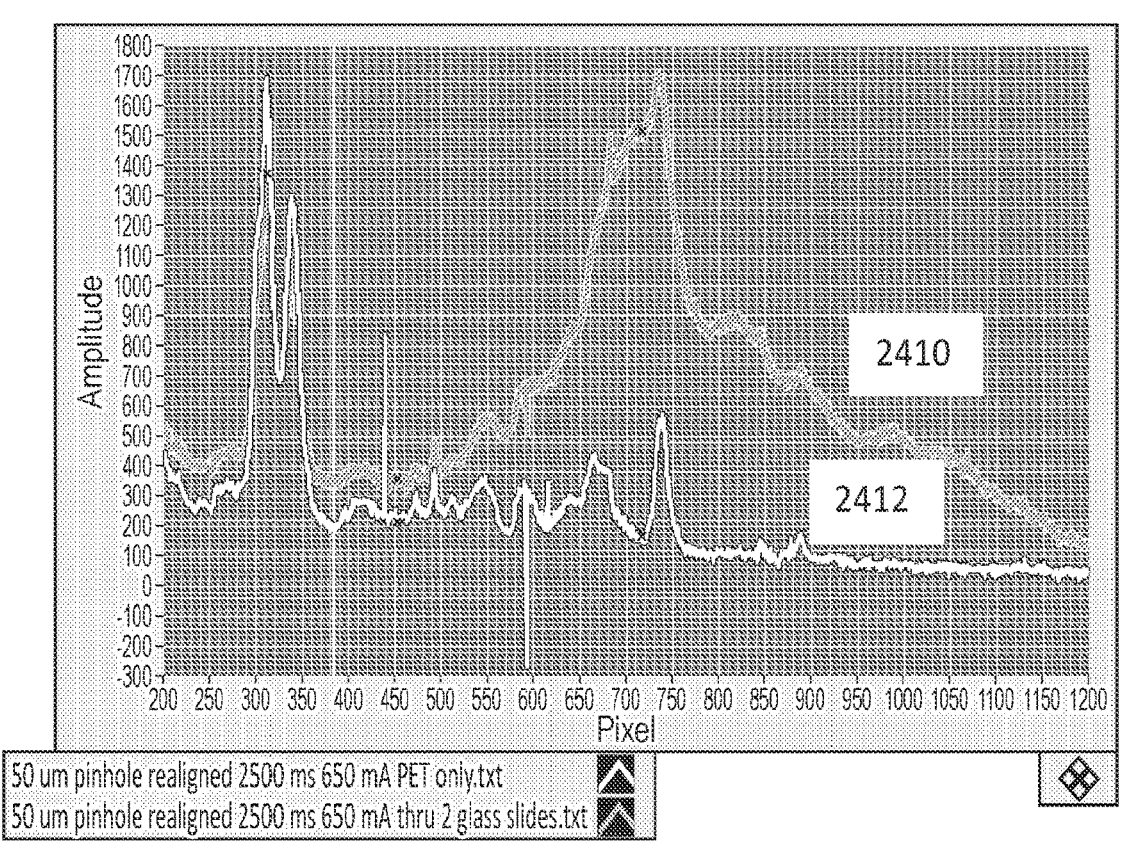
Figure 23D:
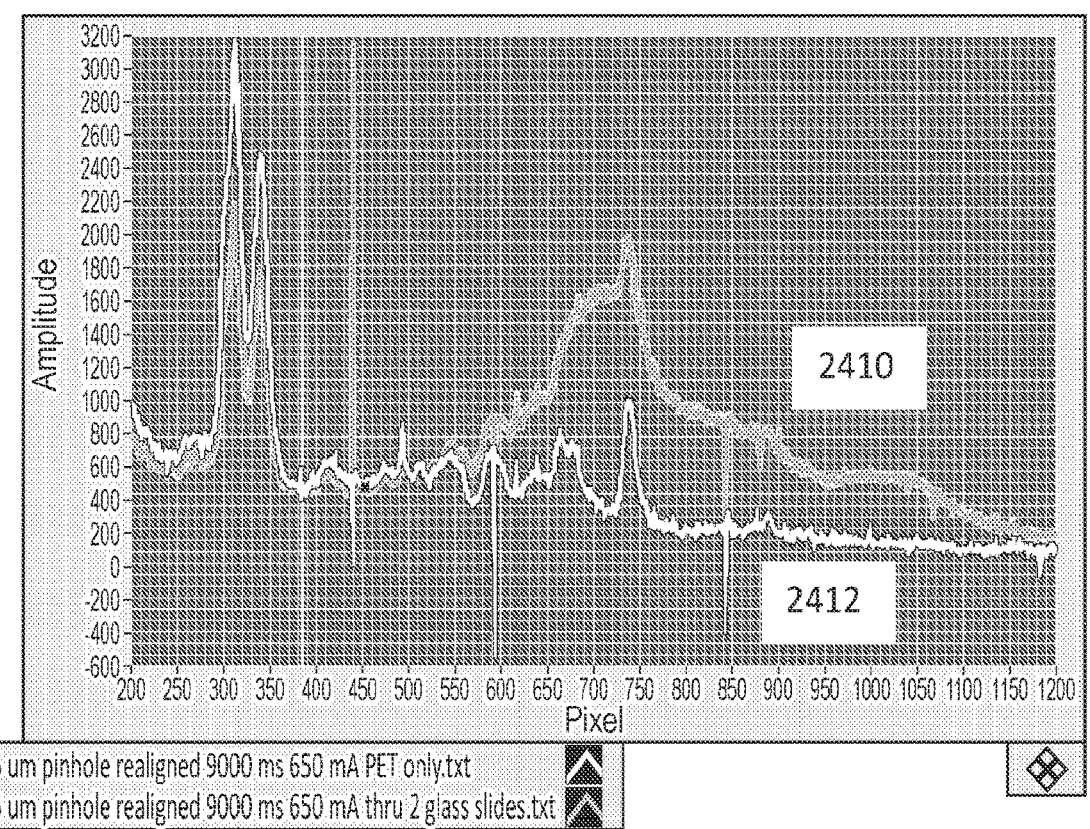
FIG. 23D shows the resultant Raman spectra when a second pinhole is selected.

FIGS. 23B-23D show Raman Spectra 2410 of the PET 2406 thought the glass slides 2404 and show Raman spectra 2412 without the glass slides 2404. FIG. 23B shows the Raman spectra where the slit is selected. FIG. 23C shows the Raman spectra where the 50 μm pinhole is selected. FIG. 23D shows the Raman spectra where the 25 μm pinhole is selected. The beam was focused at the PET layer when collecting spectra 2410 for the slit, the 50 μm pinhole, and the 25 μm pinhole experiments.

Resolution of PET specific peaks was improved by both pin holes, with better resolution using the smaller, 25 μm, pinhole. Additional time was needed to collect the spectra when using pinholes, where with the slit the spectra was collected for 500 ms (25 mA), with the 50 μm pinhole the spectra was collected for 2500 ms (650 mA) and using the 25 μm pinhole the spectra was collected for 9000 ms (650 mA).

Drop Coat Deposition Raman (DCDR)

Samples was prepared using the drop coat method. For example, the drop coat method is described in Analytical Biochemistry 353 (2006) 157-166. Briefly, a small volume (4 μL) of a 13 μM bovine serum albumin (BSA) solution was dropped on a microscope slide. The expected ring of protein formed and was dried for about 20 minutes.

Figure 24:
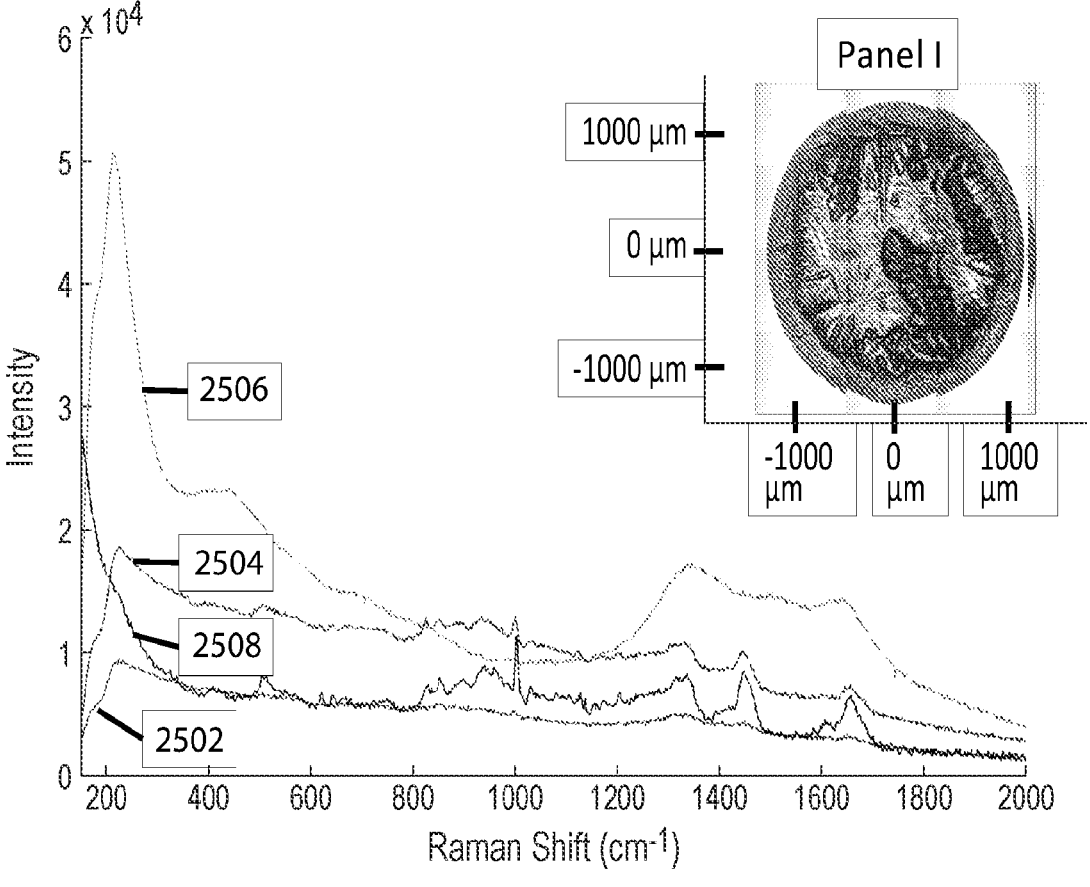
FIG. 24 illustrates analysis of a drop coat sample using the Raman system according to FIGS. 21A-21B.

The sample was analyzed using the Raman system 2200. Results are shown by FIG. 24. The inset panel I shows an image of the drop coat sample as imaged by the camera 126 of Raman system 2200. The drop has a diameter of about 2.0-2.5 mm. By driving the Raman spot to different visible parts of the ring, different spectra were obtained. Spectra 2502 is in the middle of the drop, while spectra 2504 is of an outer, drop edge, portion of the drop. Spectra 2506 is BSA in solution. Spectra 2508 is a pure BSA control (i.e. dried with minimal water).

Those having skill in the art, with the knowledge gained from the present disclosure, will recognize that various changes can be made to the disclosed apparatuses and methods in attaining these and other advantages, without departing from the scope of the present disclosure. As such, it should be understood that the features described herein are susceptible to modification, alteration, changes, or substitution. For example, it is expressly intended that all combinations of those elements and/or steps which perform substantially the same function, in substantially the same way, to achieve the same results are within the scope of the embodiments described herein. Substitutions of elements from one described embodiment to another are also fully intended and contemplated. The specific embodiments illustrated and described herein are for illustrative purposes only, and not limiting of that which is set forth in the appended claims. Other embodiments will be evident to those of skill in the art. It should be understood that the foregoing description is provided for clarity only and is merely exemplary. The spirit and scope of the present disclosure is not limited to the above implementation and examples but is encompassed by the following claims. All publications and patent applications cited above are incorporated by reference in their entirety for all purposes to the same extent as if each individual publication or patent application were specifically and individually indicated to be so incorporated by reference.

The invention claimed is:

1. A modular accessory for orienting a light path at different angles to an optical axis of a spectrometer, the modular accessory comprising:

an attachment module configured to couple to a Raman spectrometer oriented along an optical axis of the Raman spectrometer;

a base module including a visible light imager and configured to couple to the Raman spectrometer through the attachment module, the base module including an input for a sample light beam and a first beam splitter providing bifurcation of the sample light beam, the bifurcation providing a visible light beam directed to the visible light imager and a Raman light beam directed along the optical axis of the Raman spectrometer, the Raman light beam including a Raman excitation beam from the Raman spectrometer and a Raman emission beam to the Raman spectrometer; and an objective module coupled to the base module and including an objective configured to provide an optical path for the sample light beam travelling from a sample along a light path to an objective lens of the objective, through the objective, and to the input for the sample light beam of the base module, wherein the base module and the objective module are reversibly coupled.

2. The modular accessory according to claim 1, wherein the Raman spectrometer includes a user interface oriented substantially for viewing along a secondary axis of the Raman spectrometer, and oriented substantially parallel to a plane defined by the optical axis and a tertiary axis of the Raman spectrometer.

3. The modular accessory according to claim 1, wherein the objective module is selected from one or more modules each configured to orient the light path perpendicular to a different sample surface.

4. The modular accessory according to claim 3, wherein;

a first objective module is configured to orient the light path perpendicular to a first sample surface, wherein the light path is parallel to the optical axis of the Raman spectrometer;

a second objective module is configured to orient the light path perpendicular to a second sample surface, wherein the light path is parallel to a secondary axis of the Raman spectrometer; and a third objective module is configured to orient the light path perpendicular to a third sample surface, wherein the light path is parallel to the secondary axis of the Raman spectrometer, and wherein the third sample surface faces the second sample surface.

5. The modular accessory according to claim 1, wherein the attachment module is configured to provide relative rotation between the objective module and the Raman spectrometer about the optical axis of the Raman spectrometer, and wherein the relative rotation provides two or more swivel angle positions, each swivel angle position configured to orient the light path perpendicular to a different sample surface.

6. The modular accessory according to claim 1, wherein the objective module is configured to rotate and provide two or more tilt angle positions, each tilt angle position configured to orient the light path perpendicular to a different sample surface.

7. The modular accessory according to claim 1, wherein the objective module includes a sample holder including a transparent portion, wherein the transparent portion is aligned with the light path.

8. The modular accessory according to claim 1 further including a stage coupled through the Raman spectrometer to the objective module and configured to provide a substantially flat platform for sample placement.

9. The modular accessory according to claim 8, wherein the modular accessory includes actuators for relative movement between the stage and the objective module.

10. The modular accessory according to claim 1 further comprising an optics relay orienting one or more of the sample light beam, the Raman excitation beam, and Raman emission beam.

11. The modular accessory according to claim 1, wherein the objective provides a magnification of up to at least 10 times.

12. The modular accessory according to claim 1 further including a confocal assembly.

13. The modular accessory according to claim 12, wherein the confocal assembly is positioned in one of:

a. the objective module;

b. the base module and in the sample light beam; or c. the base module and in the Raman light beam.

14. The modular accessory according to claim 12, wherein the confocal assembly includes a confocal lens and a screen having a first pinhole, wherein the screen is moveable to a position wherein the first pinhole is positioned at a focal point of the confocal lens.

15. The modular accessory according to claim 14, wherein the screen includes a second pinhole having a diameter larger than the first pinhole, and the screen is movable to a second position wherein the second pinhole is positioned at the focal point of the confocal lens.

16. The modular accessory according to claim 1 further comprising a visible light source for illuminating the sample, wherein the visible light source provides an illumination beam through the objective module.

17. A portable Raman system comprising a Raman spectrometer coupled to the attachment module according to claim 1.

18. A method of analyzing a sample comprising, placing a sample in the sample light path of the portable Raman system according to claim 17.

\* \* \* \* \*